United States Patent
Lim et al.

(10) Patent No.: US 8,654,688 B2
(45) Date of Patent: Feb. 18, 2014

(54) APPARATUS AND METHOD FOR PERFORMING COMMUNICATION USING H-FDD FRAME STRUCTURE IN MOBILE COMMUNICATION SYSTEM

(75) Inventors: Dong Guk Lim, Anyang-si (KR); Jin Soo Choi, Anyang-si (KR); Han Gyu Cho, Anyang-si (KR); Jin Sam Kwak, Anyang-si (KR); Yeong Hyeon Kwon, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 13/378,663

(22) PCT Filed: Jun. 17, 2010

(86) PCT No.: PCT/KR2010/003926
§ 371 (c)(1),
(2), (4) Date: Dec. 15, 2011

(87) PCT Pub. No.: WO2010/147413
PCT Pub. Date: Dec. 23, 2010

(65) Prior Publication Data
US 2012/0127898 A1    May 24, 2012

Related U.S. Application Data

(60) Provisional application No. 61/218,038, filed on Jun. 17, 2009, provisional application No. 61/222,485, filed on Jul. 2, 2009, provisional application No. 61/236,156, filed on Aug. 24, 2009.

(30) Foreign Application Priority Data

Jun. 17, 2010  (KR) ........................ 10-2010-0057612

(51) Int. Cl.
*H04L 5/14* (2006.01)
*H04J 3/12* (2006.01)

(52) U.S. Cl.
USPC ............................ 370/281; 370/295; 370/528

(58) Field of Classification Search
USPC .................................. 370/277, 281, 295, 528
See application file for complete search history.

(56) References Cited

U.S. PATENT DOCUMENTS

| | | | |
|---|---|---|---|
| 2006/0068831 A1* | 3/2006 | Stewart et al. | 455/522 |
| 2009/0258653 A1* | 10/2009 | Helvick | 455/450 |
| 2010/0124184 A1* | 5/2010 | Dayal et al. | 370/280 |

FOREIGN PATENT DOCUMENTS

WO    2009/051455    4/2009

OTHER PUBLICATIONS

Nokia, "The Draft IEEE 802.16m System Description Document", IEEE 802.16 Broadband Wireless Access Working Group, IEEE 802.16m-08/003r3, Jun. 2008.
Intel et al., "Definitions for H-FDD mode in OFDMA", IEEE 802.16 Broadband Wireless Access Working Group, IEEE C802.16maint-04/11r2, Nov. 2004.

* cited by examiner

*Primary Examiner* — Ronald Abelson
(74) *Attorney, Agent, or Firm* — Lee, Hong, Degerman, Kang & Waimey

(57) ABSTRACT

Disclosed are an apparatus and a method for performing communication using a half-frequency division duplex (H-FDD) frame structure in a mobile communication system. A user equipment for performing communication using an H-FDD frame structure according to the present invention comprises an RF unit in which each user equipment group receives and transmits signals using the H-FDD frame structure wherein the order of the downlink zone and uplink zone are reversely allocated to each of the groups. The downlink zone and uplink zone, which are allocated to each of the user equipment groups in the H-FDD frame structure, include a sub-frame wherein one or more symbols are allocated to idle time slots or are punctured. Each of the user equipment groups can receive and transmit signals using symbols that are not allocated to the idle time slots or are not punctured in the sub-frame.

20 Claims, 20 Drawing Sheets

APPARATUS AND METHOD FOR PERFORMING COMMUNICATION USING H-FDD FRAME STRUCTURE IN MOBILE COMMUNICATION SYSTEM

CROSS-REFERENCE TO RELATED APPLICATIONS

This application is the National Stage filing under 35 U.S.C. 371 of International Application No. PCT/KR2010/003926, filed on Jun. 17, 2010, which claims the benefit of earlier filing day and right of priority to Korean Application Serial No. 10-2010-0057612, filed on Jun. 17, 2010, and also claims the benefit of U.S. Provisional Application Ser. Nos. 61/236,156, filed on Aug. 24, 2009, 61/222,485, filed on Jul. 2, 2009, and 61/218,038, filed on Jun. 17, 2009, the contents of which are all hereby incorporated by reference herein in their entirety.

FIELD OF THE INVENTION

The present invention relates to a mobile communication system, and more particularly to a method and apparatus for transmitting and receiving signals using a half-frequency division duplex (H-FDD) frame structure.

BACKGROUND ART

Institute of Electrical and Electronics Engineers (IEEE) 802.16m system can support not only a Frequency Division Duplex (FDD) scheme including a mobile station (MS) operation, but also a Time Division Duplex (TDD) scheme. IEEE 802.16m system can use an Orthogonal Frequency Division Multiplexing Access (OFDMA) scheme as the downlink (DL) or uplink (UL) multiple access scheme.

A frame structure for use in the IEEE 802.16m system will hereinafter be described in detail.

FIG. 1 illustrates a basic frame structure for use in the IEEE 802.16m system.

Referring to FIG. 1, each 20 ms superframe is divided into four equal-sized 5 ms radio frames, and the superframe starts from a superframe header (SFH). In the case of using any one of 5 MHz, 10 MHz and 20 MHz channel bandwidths, each 5 ms radio frame may be comprised of 8 subframes. One subframe may be allocated for downlink or uplink transmission. A first type subframe is defined as a subframe composed of 6 OFDMA symbols, a second type subframe is defined as a subframe composed of 7 OFDMA symbols, and a third type subframe is defined as a subframe composed of 5 OFDMA symbols.

The basic frame structure includes an H-FDD mobile station (MS) operation, and can be applied to the FDD and TDD schemes. In the TDD system, the number of switching points for use in each radio frame is set to 2. The switching points may be defined according to a variation in the directivity from downlink to uplink or from uplink to downlink.

The H-FDD MS may be contained in the FDD system, and the frame structure at the viewpoint of the H-FDD MS is similar to the TDD frame structure. However, uplink and downlink transmission may occur in two individual frequency bands. A transmission gap from uplink to downlink (or vice versa) is needed for a transmission function and a reception circuit switching function.

FIG. 2 shows an FDD frame structure for 5 MHz, 10 MHz, and 20 MHz channel bandwidths. In FIG. 2, a cyclic prefix (CP) length for use in the FDD frame structure is set to ⅛ of an effective symbol length.

Referring to FIG. 2, a base station (BS) supporting the FDD scheme can simultaneously support a half-duplex MS and a full-duplex MS that are operated with the same RF carrier. The MS supporting the FDD scheme has to use any one of the H-FDD scheme or the FDD scheme. All the subframes can be available for uplink and downlink transmission. Downlink and uplink transmission may be separated from each other in a frequency domain. One superframe may be divided into four frames, and one frame may be composed of 8 subframes.

As described above, the IEEE 802.16m system has to support not only a Half-Frequency Division Duplex (H-FDD) scheme but also a Full-Frequency Division Duplex (F-FDD) scheme, and also has to support an MS utilizing a legacy system. However, the frame structure capable of supporting not only the MS utilizing the legacy system but also another MS utilizing the improved system has not been proposed yet.

In addition, a frame structure capable of supporting not only two or more wireless communication schemes but also the MS utilizing the H-FDD frame structure has not been investigated yet.

DETAILED DESCRIPTION OF THE INVENTION

Technical Problem

An object of the present invention is to provide a method for performing communication using an H-FDD frame structure in a mobile communication system.

Another object of the present invention is to provide an apparatus for performing communication using an H-FDD frame structure.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing communication using a half-frequency division duplex (H-FDD) frame structure in a mobile communication system including transceiving signals by each group mobile stations (MSs) to transmit/receive signals using the H-FDD frame structure in which the order of a downlink zone and an uplink zone is allocated to one group and the reverse order thereof is allocated to another group, wherein the downlink zone or uplink zone allocated to the each group MS in the H-FDD frame structure includes a subframe in which at least one symbol is allocated to an idle time or punctured, and each group MS transmits and receives signals using the remaining symbols other than the symbol allocated to the idle time or punctured in the subframe.

Each of an uplink zone used by a first group MS from among the each group MS and a downlink zone used by a second group MS from among the each group MS may include two subframes in which one or more symbols are allocated to the idle time or punctured.

Each of a downlink zone used by a first group MS from among the each group MS and a downlink zone used by a second group MS from among the each group MS may include one subframe in which one or more symbols are allocated to the idle time or punctured.

Each of an uplink zone used by a first group MS from among the each group MS and an uplink zone used by a second group MS from among the each group MS may include one subframe in which one or more symbols are allocated to the idle time or punctured.

The subframe in which one or more symbols are allocated to the idle time or punctured may include first and last uplink subframes used by the first group MS and first and last downlink subframes used by the second group MS.

The subframe in which one or more symbols are allocated to the idle time or punctured may include the last downlink subframe used by the first group MS and a first downlink subframe used by the second group MS.

The subframe in which one or more symbols are allocated to the idle time or punctured may include a first uplink subframe used by the first group MS and the last uplink subframe used by the second group MS.

The subframe in which one or more symbols are allocated to the idle time or punctured may include 5 or 6 symbols.

A channel bandwidth of the H-FDD frame structure may be set to any one of 5 MHz, 7 MHz, 8.75 MHz, 10 MHz, and 20 MHz.

A cyclic prefix (CP) length of the H-FDD frame structure may be set to ⅛ or 1/16 of an effective symbol length.

In another aspect of the present invention, a mobile station (MS) for performing communication using a half-frequency division duplex (H-FDD) frame structure in a mobile communication system includes a radio frequency (RF) unit to transmit and receive signals by each group mobile station (MS) using the H-FDD frame structure in which the order of a downlink zone and an uplink zone is allocated to one group and the reverse order thereof is allocated to another group, wherein the downlink zone or uplink zone allocated to the each group MS in the H-FDD frame structure includes a subframe in which at least one symbol is allocated to an idle time or punctured, and the each group MS transmits and receives signals using the remaining symbols other than the symbol allocated to the idle time or punctured in the subframe.

Effects of the Invention

As is apparent from the above description, the H-FDD frame structure according to the present embodiment performs frame alignment with the legacy FDD frame structure, such that it can support the H-FDD MS without affecting a mobile station (MS) utilizing the legacy FDD frame.

Symbol level puncturing or DU_Offset value is applied to the H-FDD frame structure according to the present embodiment. Thus, if the H-FDD UE transmits and receives signals, the legacy H-FDD frame structure has more available subframes, such that data can be efficiently transmitted.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
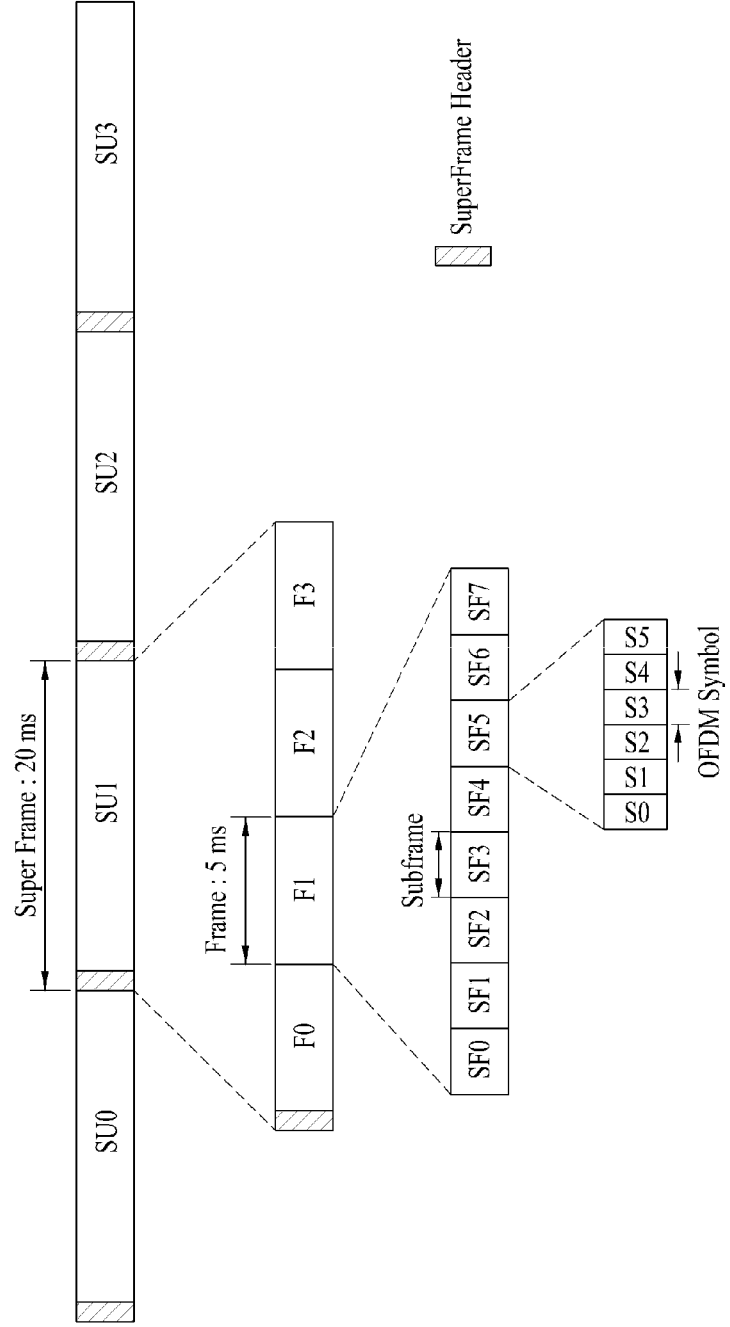
FIG. 1 exemplarily shows a basic frame structure for use in the IEEE 802.16m system.
Figure 2:
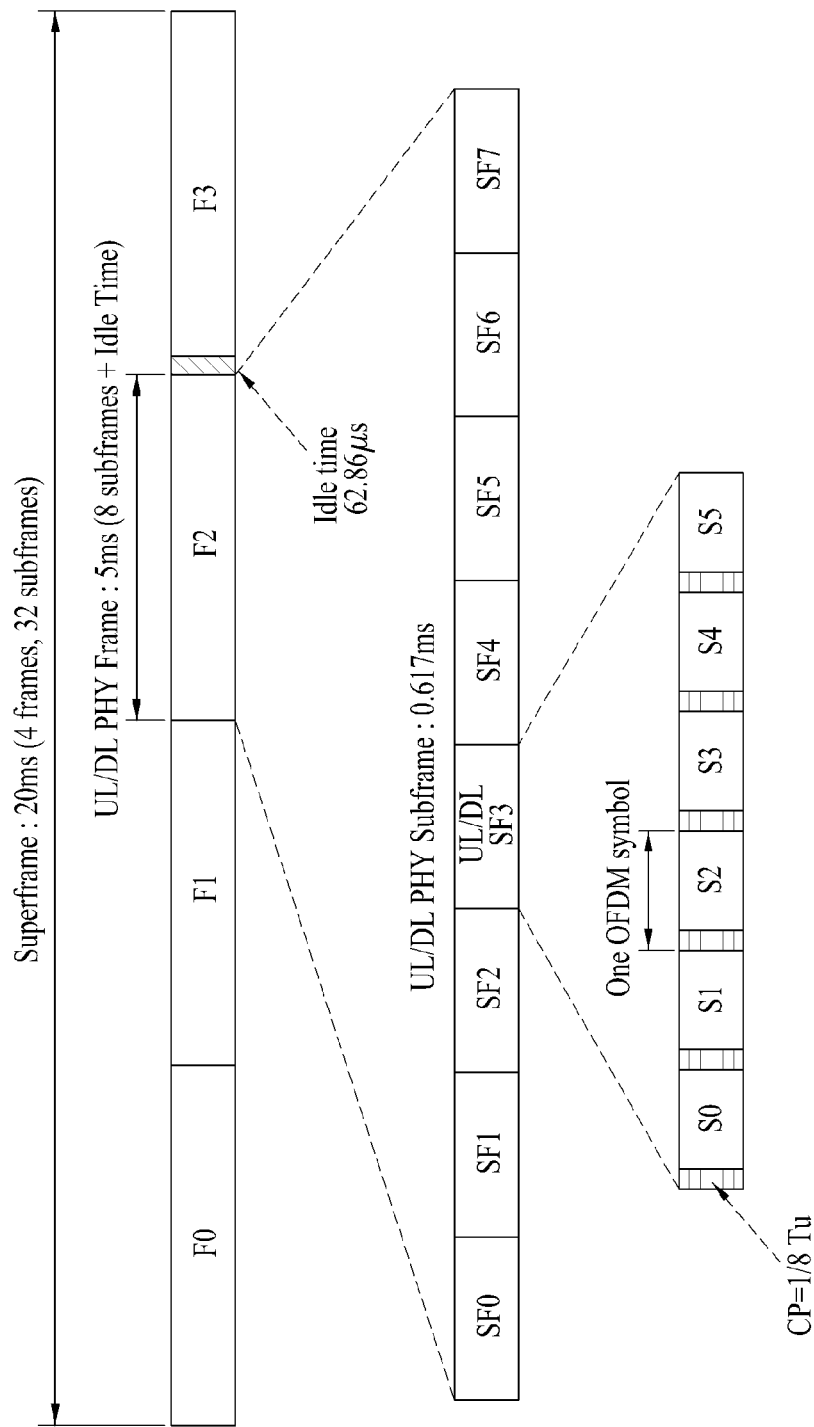
FIG. 2 exemplarily shows that an FDD frame structure for 5 MHz, 10 MHz, and 20 MHz channel bandwidths has a CP length corresponding to ⅛ of an effective symbol length.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the eNode B (eNB) may refer to an arbitrary node of a network end which communicates with the above terminal, and may include a base station (BS), a Node B (Node-B), an access point (AP) and the like.

In a mobile communication system, the UE may receive information from the eNode B via downlink, and may transmit information via uplink. The information that is transmitted and received to and from the UE includes data and a variety of control information. There are a variety of physical channels according to categories of transmission (Tx) and reception (Rx) information of the UE.

In the present embodiment, the F-FDD MS refers to an MS for using the F-FDD frame structure, and the H-FDD MS refers to an MS for using the H-FDD frame structure. The legacy system refers to any of systems developed earlier than the IEEE 802.16m. For example, the IEEE 802.16e system may be used as the legacy system.

The FDD frame structure for simultaneously supporting the WirelessMAN OFDMA (for example, IEEE 802.16e system) acting as the legacy system and the Advanced Air Interface (AAI) system (for example, IEEE 802.16m system) acting as the next generation system will hereinafter be described in detail. Herein, it should be noted that types or definitions of the legacy system and the improved system are disclosed only for illustrative purposes, and the scope or spirit of the types and definitions of the legacy and improved systems are not limited thereto. In this case, in order to support the two systems (i.e., the legacy system and the improved system), it is assumed that two systems for use in one frame coexist in one frame using a Time Division Multiplexing (TDM) scheme. A mobile station (MS) using the IEEE 802.16m system acting as an example of the next-generation mobile communication system is referred to as '16m MS' or 'MS', and an MS using the legacy system is referred to as 'legacy MS', '16e MS', or the like. The term 'MS' may conceptually include '16m MS', 'legacy MS', etc.

The present embodiment can support the two coexisting systems using the H-FDD frame structure. In this case, each MS may be divided into two groups so as to support the H-FDD MSs utilizing the same system. The order of a downlink zone and an uplink zone allocated to each group is reversed. That is, assuming that the order of the downlink zone and the uplink zone is allocated to a first group UE, the order of the uplink zone and the downlink zone is allocated to a second group UE.

The embodiments of present invention provide a method for supporting an H-FDD MS using the above-mentioned H-FDD frame structure without affecting an MS that uses the legacy FDD frame by performing frame alignment with the legacy FDD frame structure.

The present embodiment has to receive significant signals (e.g., advanced-preamble (hereinafter referred to 'A-preamble'), a superframe header (SFH), a frame control header (FCH), etc.) transmitted in the FDD frame structure of the IEEE 802.16m, such that it is necessary to construct the H-FDD structure to prevent uplink frames from overlapping with each other in a transmission interval of the important information.

In addition, differently from the legacy FDD frame structure, the H-FDD frame structure requires an interval for switching between downlink and uplink allocated to each group. Therefore, it is necessary to establish an idle time for DL/UL switching in a DL or UL region. In this case, the subframes to be allocated for the DL/UL switching are arranged at the same positions in the DL/UL region. Therefore, a gap for the switching interval is present in the two groups, and the H-FDD frame aligned with the FDD frame structure at 5 MHz, 10 MHz, or 20 MHz is shown in FIG. 3.

Figure 3:
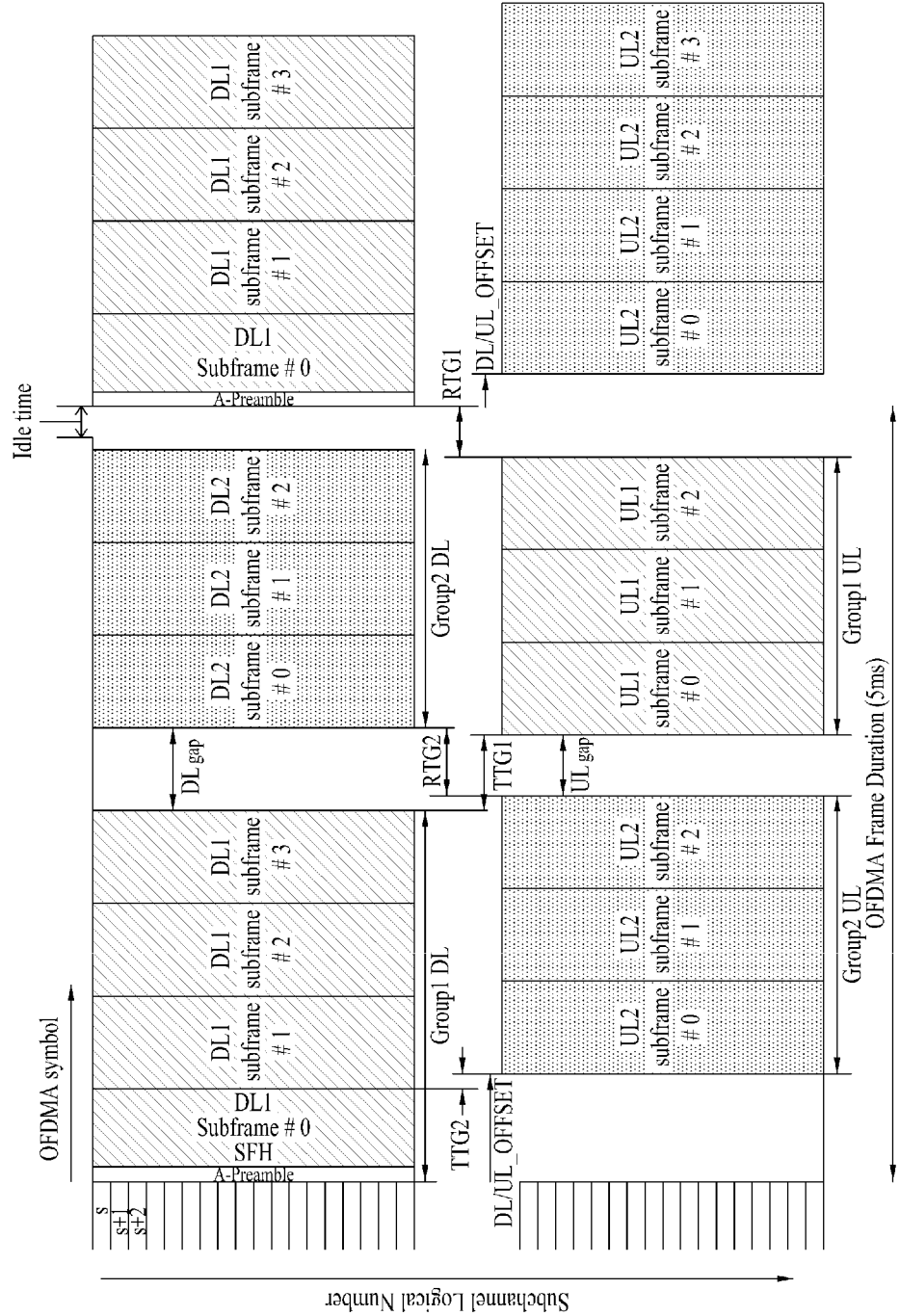
FIGS. 3 and 4 exemplarily illustrate the H-FDD frame structure for supporting the H-FDD MS in an Advanced Air Interface (AAI) system acting as an example of a mobile communication system.
Figure 4:
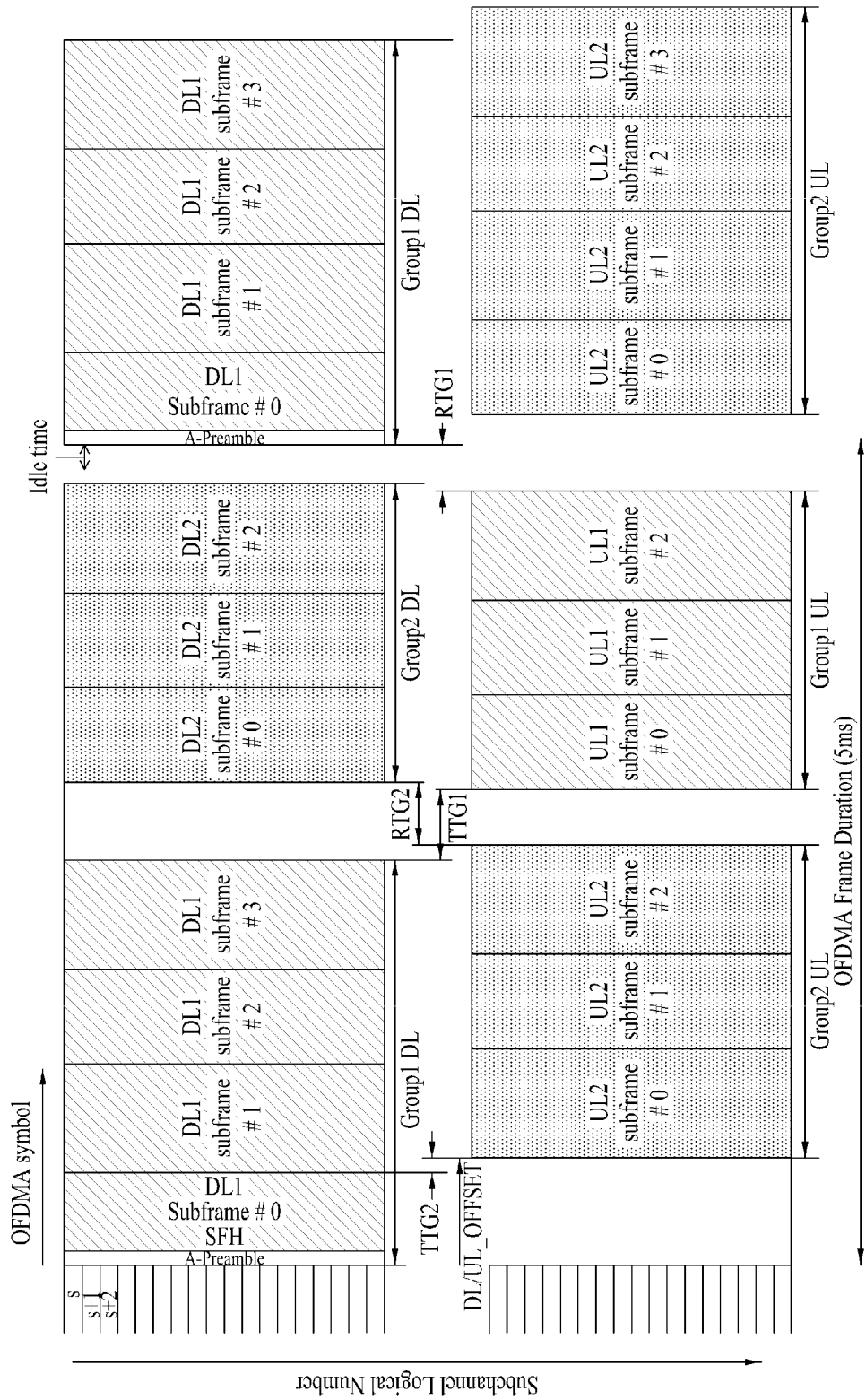

FIGS. 3 and 4 exemplarily illustrate the H-FDD frame structure for supporting the H-FDD MS in an Advanced Air Interface (AAI) system acting as an example of a mobile communication system;

FIG. 3 exemplarily shows an H-FDD frame structure having a CP length corresponding to ⅛ of a 5 MHz, 10 MHz, or 20 MHz channel bandwidth. FIG. 4 exemplarily shows an H-FDD frame structure having a CP length corresponding to 1/16 of 5 MHz, 10 MHz, or 20 MHz channel bandwidth.

The FDD frame for use in the 5/10/20 MHz channel bandwidths is composed of a type-1 subframe, such that a subframe allocated for the idle time is a Type-1 subframe. In this case, the position of the subframe allocated or punctured for the idle time may be changed according to the length of a region allocated to two groups. Therefore, the example of FIG. 3 is disclosed only for illustrative purposes, and the position of subframe to be punctured is not limited thereto and can also be applied to other examples.

The H-FDD frame structure shown in FIG. 3 maintains frame alignment in the same manner as in the legacy FDD frame structure, and at the same time supports the H-FDD MS. Therefore, the H-FDD frame structure can minimize the influence of an MS that uses the FDD structure of the legacy IEEE 802.16m system. Referring to FIG. 3, in order to maintain frame alignment with the legacy FDD frame structure as well as to support the H-FDD MS, one subframe may be assigned to a UL/DL or an idle time for UL-to-DL or DL-to-UL switching. For example, in the FDD frame structure composed of eight type-1 subframes, one subframe between downlink zones assigned to two groups may be used as an idle time. Therefore, a DLgap corresponding to one subframe exists between two groups in a DL frame.

As described above, MSs contained in two groups in the H-FDD structure have to receive significant signals (e.g., a superframe header (SFH), A-preamble, etc.) transmitted from each frame, such that a frame duration in which the significant signals are transmitted in a DL zone is prevented from overlapping with an uplink frame section interval as shown in FIG. 3. In the FDD frame structure of the IEEE 802.16m system, the SFH is transmitted to a mobile station (MS) through a first subframe of a first frame of a superframe. Therefore, the H-FDD frame structure uses the legacy FDD frame structure, such that the SFH is transmitted in the same manner as in the legacy FDD frame structure.

In order to allow all MSs to receive the SFH in the H-FDD frame structure, a subframe of the frame duration for SFH transmission in the uplink zone needs to be punctured or needs to be assigned to an idle time as shown in FIG. 3. By means of the above-mentioned frame structure, the MS may receive a variety of signals from a base station (BS) through the significant signals (e.g., A-preamble, SFH, A-MAP, etc.). For example, the MS may receive a DL/UL_OFFSET signal, DL/UL allocation information (e.g., start point information, subframe configuration information, subframe number, subframe order, DL/UL length, etc.), a group indicator, a Transmit Transition Gap (TTG), a Receive Transition Gap (RTG), puncturing subframe information (e.g., the position, index, and type information of the puncturing subframe), idle time information (e.g., DL/UL gap), etc. from the BS. The H-FDD MS having received the above-mentioned information from the BS can recognize information of the allocated DL/UL zones using the received information. In this case, each of TTG and RTG values transmitted through the significant signals has a constant value irrespective of frames. Values for constructing the frame structure at 5/10/20 MHz channel bandwidths are as follows.

TTG1 and RTG1 for Group 1

Two symbol durations<TTG1+RTG1≤Type-1 subframe duration+idle time

Assuming that a DLgap is identical to the length of a subframe assigned for the switching duration, the following expression is achieved.

Two symbol durations<TTG1+RTG1=DLgap+idle time

TTG2 and RTG2 for Group 2

Two symbol durations<TTG2+RTG2≤DLgap

Two symbol durations<TTG2+RTG2≤subframe duration punctured in DL frame

Assuming that RTG2 is identical to ULgap (i.e., RTG2=ULgap), "TTG2+RTG2=TTG2+ULgap" is expressed.

In addition, it is also assumed that RTG2 is always lower than TTG1.

As shown in FIG. 3, the H-FDD MS can recognize the position of a start point of the allocated UL frame using the UL/UL_OFFSET signal received from the BS. In this case, DL/UL_OFFSET denotes an offset value from a start point of the DL frame to a start point of the UL frame. DL/UL_OFFSET may be transmitted to each group UE, or may be transmitted only to Group 2 MS so as to designate the start point of the UL zone. If DL/UL_OFFSET is transmitted only to Group 2 MS, Group 1 MS can recognize the start point of an uplink frame using TTG1 or DLgap. DL/UL_OFFSET for designating the start point of the UL frame may have the same value in the superframe, or may have different values in individual frames. If DL/UL_OFFSET has the same value in the superframe, the DL/UL_OFFSET can be represented as follows.

DL/UL_OFFSET≥first subframe duration punctured in UL frame+TTG1

If DL/UL_OFFSET is differently established in each frame, a first frame of a superframe has to satisfy the above-mentioned expression, and the remaining frames can be represented as follows.

Two symbol durations<DL/UL_OFFSET<subframe duration punctured in UL frame for DL/UL transaction In order to receive significant signals (e.g., A-preamble, SFH, etc.) as shown in the first frame of FIG. 3 under the condition that different DL/UL_OFFSET values are not used in respective frames, a subframe identical to a DL zone in which significant signals are transmitted may be assigned to an idle time or be punctured in such a manner that the resultant frame is configured. In this case, the subframe located at the first subframe of the uplink at each frame may be assigned to an idle time or punctured, such that the H-FDD frame structure can be configured.

In the case of a frame structure having a CP length corresponding to ⅟16 (i.e., ⅟16 CP) of an effective symbol length for 5/10/20 MHz channel bandwidths, the FDD frame is composed of 5 type-1 subframes and 3 type-2 subframes. Accordingly, as described above, for the DL/UL switching duration, a type-1 or type-2 subframe may be assigned to an idle time or punctured so that the H-FDD frame structure can be configured. In this case, in order to reduce waste of frames, it is preferable that the idle time for the switching duration be assigned to the type-1 subframe or punctured.

In addition, there is a need for a frame duration in which significant signals are transmitted not to overlap with a UL frame zone in such a manner that the H-FDD MS can receive significant signals (e.g., SFH, A-preamble, etc.) transmitted in a DL frame. As described above, a subframe of a UL frame duration identical to the subframe duration including a superframe header (SFH) is punctured. In addition, other frames contained in the superframe are configured in such a manner that a subframe of a first UL frame can be punctured in the same manner as in the above-mentioned subframe of the UL frame.

Figure 5:
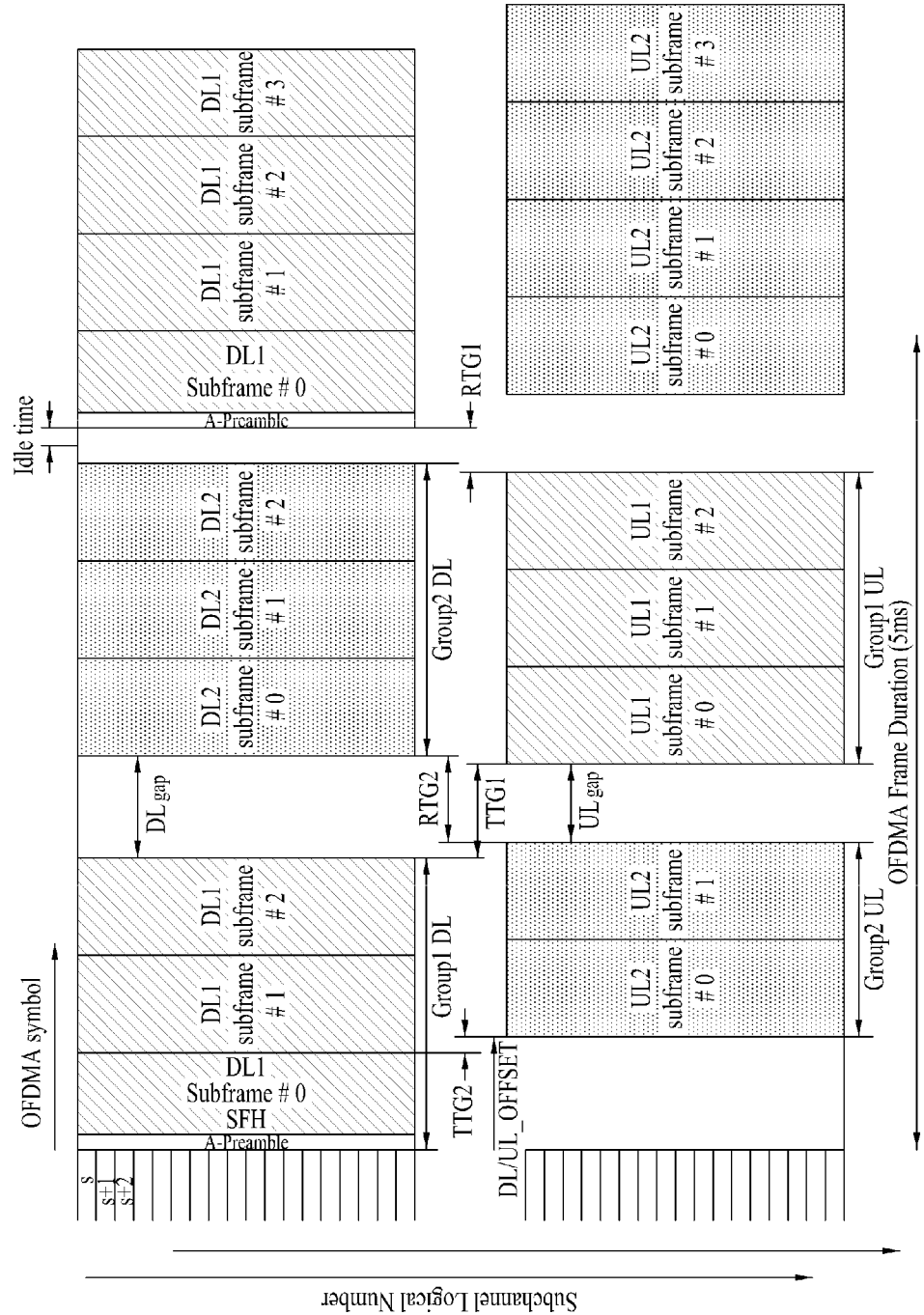
FIG. 5 exemplarily illustrates the H-FDD frame structure for supporting the H-FDD MS in the AAI system acting as an example of a mobile communication system.

FIG. 5 exemplarily illustrates the H-FDD frame structure for supporting the H-FDD MS in the AAI system acting as an example of a mobile communication system.

The H-FDD frame structure having a ⅛ CP length for a 8.75 MHz channel bandwidth shown in FIG. 5 can support the H-FDD MS using the above-mentioned structure. The FDD frame structure having the ⅛ CP length for 8.75 MHz channel bandwidth is composed of a type-1 subframe and a type-2 subframe. Therefore, a subframe to which the idle time for DL/UL switching is assigned or a subframe to be punctured in the H-FDD frame structure may be a type-1 subframe composed of 6 symbols or a type-2 subframe composed of 7 symbols. In order to reduce waste of frames in the H-FDD frame structure, it is preferable that the type-1 subframe be punctured or be assigned to an idle time.

In case of the H-FDD frame structure shown in FIG. 5, one subframe for DL/UL switching is allocated, and an uplink subframe identical to a subframe duration in which the SFH is transmitted to receive significant signals is punctured so that the H-FDD frame structure can be configured. Types and locations of subframes to be punctured are disclosed only for illustrative purposes, and the scope or spirit of the present invention is not limited thereto.

Figure 6:
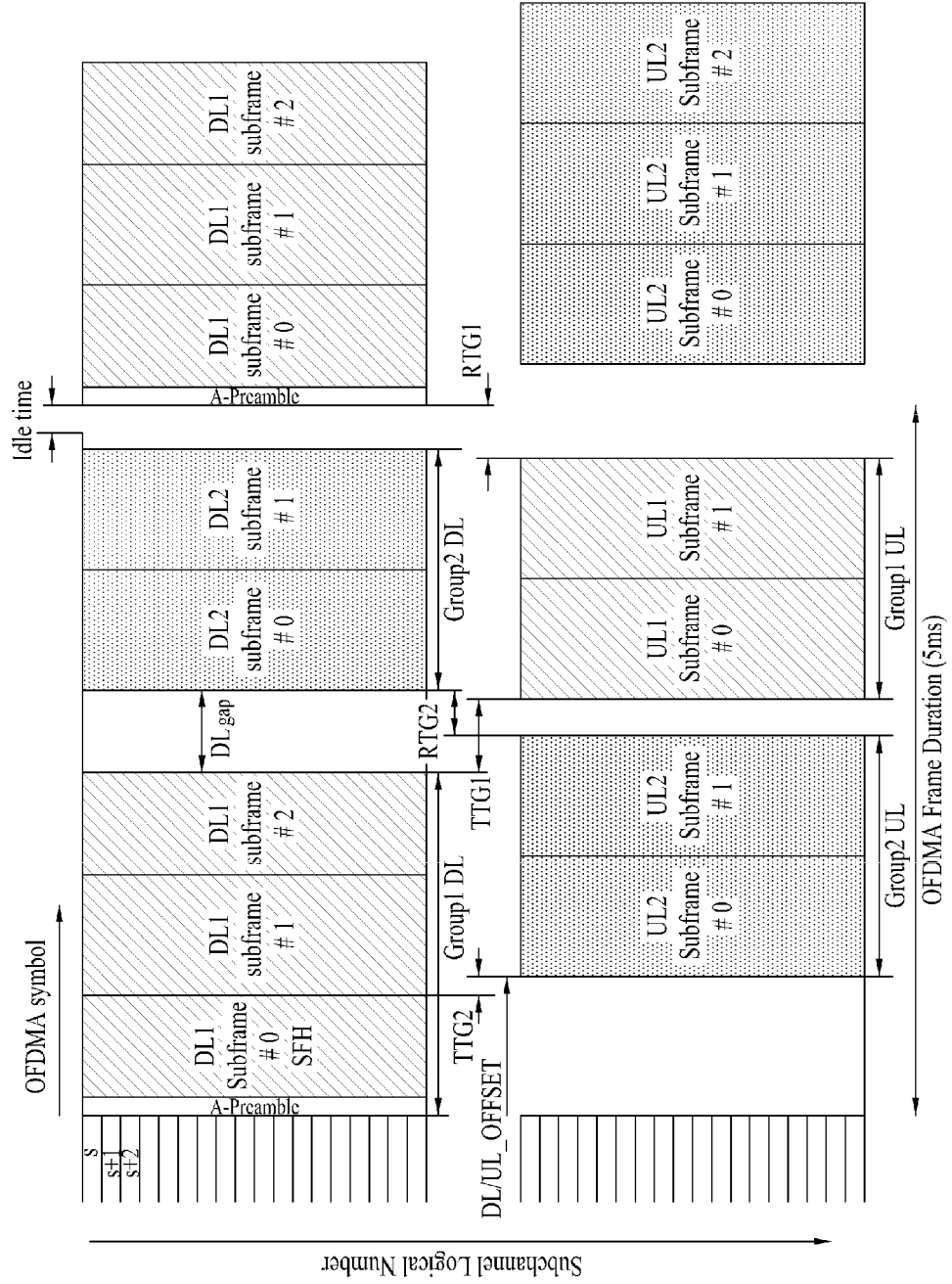
FIG. 6 exemplarily illustrates the H-FDD frame structure for supporting the H-FDD MS in the AAI system acting as an example of a mobile communication system.

FIG. 6 exemplarily illustrates the H-FDD frame structure for supporting the H-FDD MS in the AAI system acting as an example of a mobile communication system.

Referring to FIG. 6, the FDD frame structure including a ⅛ CP length for the 7 MHz channel bandwidth includes a type-1 subframe and a type-3 subframe. Accordingly, in the case of the 7 MHz channel bandwidth, a subframe to be allocated or punctured for the idle time when constructing the H-FDD frame structure in the same manner as in the 5/10/20 MHz or 8.75 MHz channel bandwidth may be a type-1 subframe or a type-3 subframe. FIG. 6 shows the H-FDD frame structure for the 7 MHz channel bandwidth. In this case, the position of a subframe to be allocated or punctured for the idle time is not limited thereto, and can also be set to other positions as necessary.

For the idle time for the same DL/UL switching as in the legacy FDD frame structure, a symbol may be allocated or punctured for the idle time within the legacy subframe, such that the H-FDD frame structure for supporting the H-FDD MS can be configured. Therefore, according to the H-FDD frame structure, some symbols of a subframe may be allocated or punctured for the DL/UL switching duration in such a manner that the H-FDD frame can be configured. In this case, the number of symbols to be allocated or punctured for the DL/UL switching duration may be set to 1 or higher. Since the BS allocates or punctures some symbols of the subframe in order to guarantee an idle time, data can be transmitted to the MS using some parts from among symbols contained in the subframe. Therefore, the number of one-symbol-punctured subframes from among subframes having been used in the legacy FDD frame structure is less than that of the legacy subframe by one symbol. That is, the punctured subframe has a smaller number of symbols than the legacy subframe by one symbol.

For example, in the FDD frame structure having a ⅛ CP length for 5/10/20 MHz channel bandwidths, one subframe includes 6 symbols. However, if one symbol is allocated or punctured for a transition gap, a subframe composed of 5 symbols is configured. Therefore, the H-FDD MS can receive information (e.g., subframe index, subframe position, the number of symbols for puncturing, symbol position (position within a subframe), group indicator, DL/UL, punctured subframe type, etc.) regarding symbols to be allocated or punctured for such switching from the BS through significant signals (e.g., A-preamble, SFH, A-MAP, etc.). In addition, if the F-FDD MS coexists with the H-FDD MS, information transmitted to the H-FDD MS is transmitted to the F-FDD MS, such that the F-FDD MS can recognize that a subframe structure (e.g., a subframe composed of 5 symbols) but not the basic subframe structure (i.e., a subframe composed of 6 symbols) exists in the frame and can also recognize information regarding the existing subframe structure. As a result, the F-FDD MS can transmit signals using the subframe composed of 5 symbols. In addition, a control channel composed of 5 symbols is formed and used in case of uplink. The BS can transmit information regarding idle symbols or puncturing symbols to the H-FDD MS and the F-FDD MS through an SFH or additional broadcast information (ABI). In other words, in the case of using symbol-level puncturing to establish the DL/UL switching duration in the H-FDD frame structure, the BS has to transmit information regarding the puncturing symbol to the H-FDD MS and the F-FDD MS so as to inform the H-FDD MS and the F-FDD MS of the presence of a subframe composed of 5 symbols. In addition, the BS may also inform the F-FDD MS having been used a subframe structure composed of 6 symbols of an unused situation of one symbol of a specific subframe.

Figure 7:
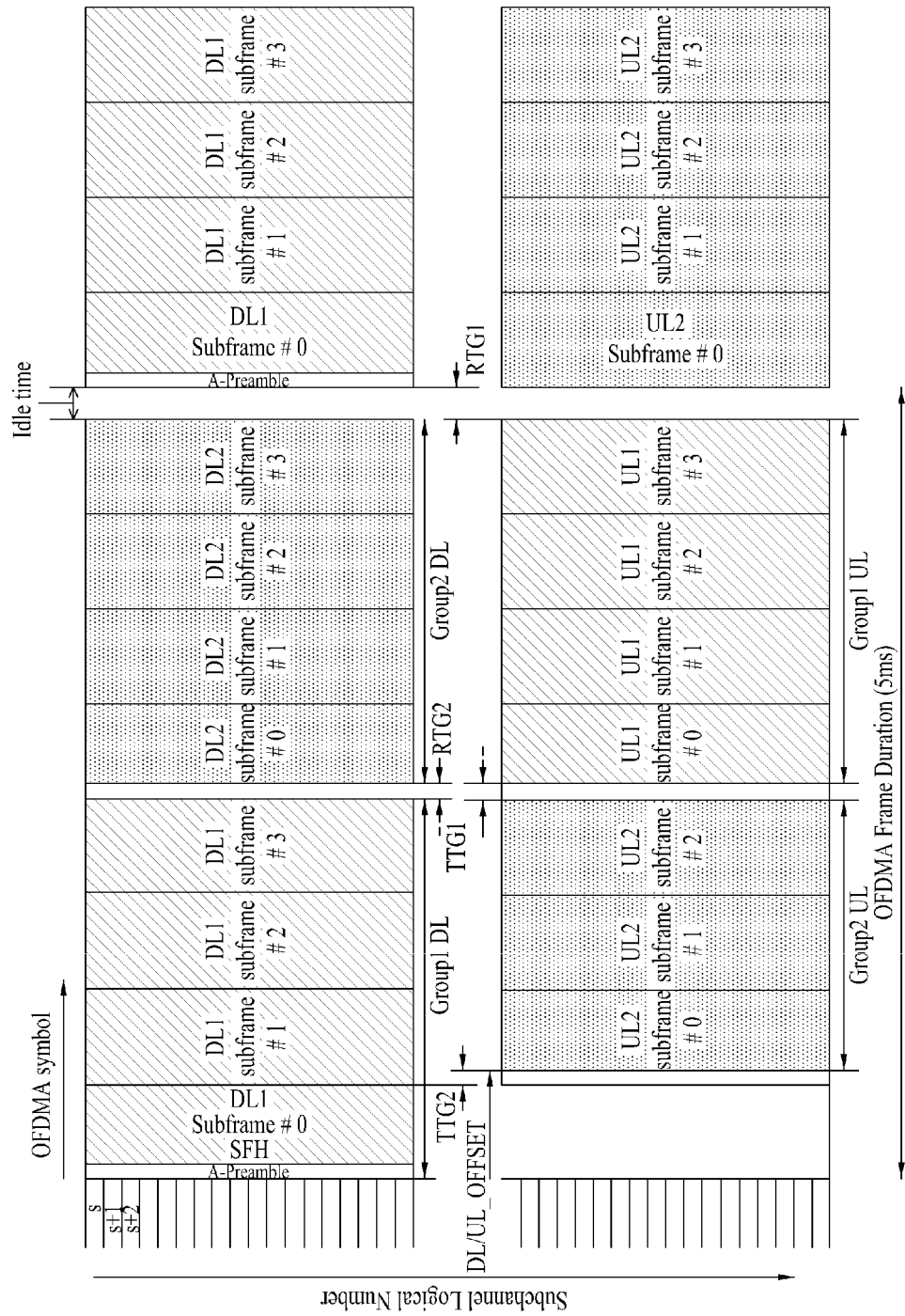
FIG. 7 exemplarily illustrates the H-FDD frame structure for supporting the H-FDD MS through symbol puncturing in the AAI system acting as an example of a mobile communication system.

FIG. 7 exemplarily illustrates the H-FDD frame structure for supporting the H-FDD MS through symbol puncturing in the AAI system acting as an example of a mobile communication system;

The H-FDD frame structure of FIG. 7 is configured to support the H-FDD MS through symbol puncturing in the FDD frame structure having a ⅛ CP length for the 5/10/20 MHz channel bandwidths. Even in the case of the H-FDD frame structure shown in FIG. 7, in order for MSs belonging to two groups to receive significant signals (e.g., A-preamble, SFH, etc.) from the BS, it is necessary to construct an uplink frame in such a manner that a DL frame duration in which significant signals are transmitted does not overlap with a UL frame duration. That is, there is a need for an uplink subframe identical to a DL frame duration corresponding to a subframe including an SFH to be allocated or punctured for the idle time.

In addition, the BS transmits the SFH only in the first subframe of the superframe, and each group MS has to receive the A-preamble transmitted at each frame. In the remaining frames other than a first frame within the superframe, there may be used a method for puncturing two symbols in consideration of the A-preamble reception direction and the TTG as shown in FIG. 7.

In this case, since two symbols of one subframe are punctured in the UL zone, the H-FDD MS transmits data to the BS using four symbols such that it is necessary to construct a new control channel. In addition, a first subframe of an uplink is punctured in all frames in the same manner as in one subframe punctured in the frame including the SFH, such that the H-FDD frame can be configured. A start point of an uplink frame of each group can be recognized in the UL frame duration on the basis of DL/UL_OFFSET, and a detailed description thereof will hereinafter be described in detail 1. First Frame within Superframe
DL/UL_OFFSET=subframe duration+TTG2

One exemplary case in which one symbol is punctured for TTG can be denoted by the following expression.

DL/UL_OFFSET=One subframe duration+One symbol duration (TTG2=one symbol duration)

2. Other Frames within Superframe
Case 1: Puncturing of two symbols
DL/UL_OFFSET=Two symbol durations
Case 2: Puncturing of one subframe
DL/UL_OFFSET=One subframe duration Therefore, DL/UL_OFFSET may have different values in respective groups of a frame or may also have different values in respective frames.

As shown in FIG. 7, for DL/UL switching between two groups of the H-FDD frame structure, a first symbol of Group 2 DL subframe 0 (DL2 subframe #0) and a first symbol of Group 1 UL subframe 0 (UL1 subframe #0) are punctured to support the H-FDD MS. In this case, 5 symbols are used in each of Group 2 DL subframe 0 (DL2 subframe #0) and Group 2 UL subframe (UL1 subframe #0). In this case, symbols punctured for DL/UL switching may be set to Group 1 DL subframe 3 (DL1 subframe #) and Group 2 UL subframe 2 (UL2 UL subframe #2) that exist in the same positions between two groups. In addition, if the idle time for use in the above-mentioned FDD frame structure is shorter than the DL/UL switching duration in the H-FDD frame structure, the last symbol of Group 2 DL subframe 3 (DL2 subframe #3) and the last symbol of Group 1 UL subframe 3 (UL1 UL subframe #3) may be assigned to the idle time or punctured for the switching duration.

In this way, if one symbol is assigned for the switching duration (TTG/RTG) in the DL or UL zone, a subframe composed of 5 symbols may be generated in the DL or UL zone. In case of uplink (UL), in order for the H-FDD MS to transmit data using a subframe composed of 5 symbols, it is necessary to define an uplink control channel composed of 5 symbols. In addition, in order to perform DL/UL switching, the last symbols of subframes located in the boundary region of two groups may be punctured or assigned for the idle time. For example, the last symbols of Group 2 DL subframe 0 (DL2 subframe #0), Group 1 UL subframe 0 (UL1 subframe #0), Group 1 DL subframe 3 (DL1 subframe #3), and Group 2 UL subframe 2 (UL2 subframe #3) may be punctured or assigned for the idle time. In this case, a subframe composed of 5 symbols exists in a DL or UL zone of the region assigned to each group, and data is transmitted using the subframe. In addition, in case of the uplink, it is necessary to form a new control channel composed of 5 symbols.

Differently from the above-mentioned case, a gap between two groups generated when the idle time for DL/UL switching is established may not be assigned to both the DL zone and the UL zone and be assigned to only one of them as necessary. For example, when generating the gap for DL/UL switching only in the DL zone, symbols are punctured in the DL subframe located at the boundary region of two groups (i.e., the region overlapping with the switching duration) are punctured so that the H-FDD frame structure can be configured. In this case, each punctured symbol may be assigned to the subframe contained in each group. For example, the last symbol of Group 1 DL subframe 3 (DL1 subframe #3) present in the switching duration and the first symbol of Group 2 DL subframe 0 (DL2 subframe #0) are punctured, such that one subframe for the DL zone is composed of 5 symbols.

Therefore, signal and data are transmitted in the DL zone using the subframe composed of 5 symbols. In contrast, signal and data are transmitted in the UL zone using the subframe composed of 6 symbols, such that an additional uplink control channel need not be defined. However, if symbols for the idle time of the DL/UL switching are assigned to the UL zone, the H-FDD MS transmits signals over a control channel composed of 5 symbols. In this case, the H-FDD MS can receive signals through downlink using a basic subframe structure composed of 6 symbols. Therefore, when forming an idle time using the symbol level puncturing for the DL/UL switching as described above, at least one subframe composed of 5 symbols exists between two groups in the DL or UL zone. The above-mentioned example is disclosed only for illustrative purposes for convenience of description, such that various symbol allocation methods for such DL/UL switching can be applied irrespective of a band and CP length used by an MS.

Figure 8:
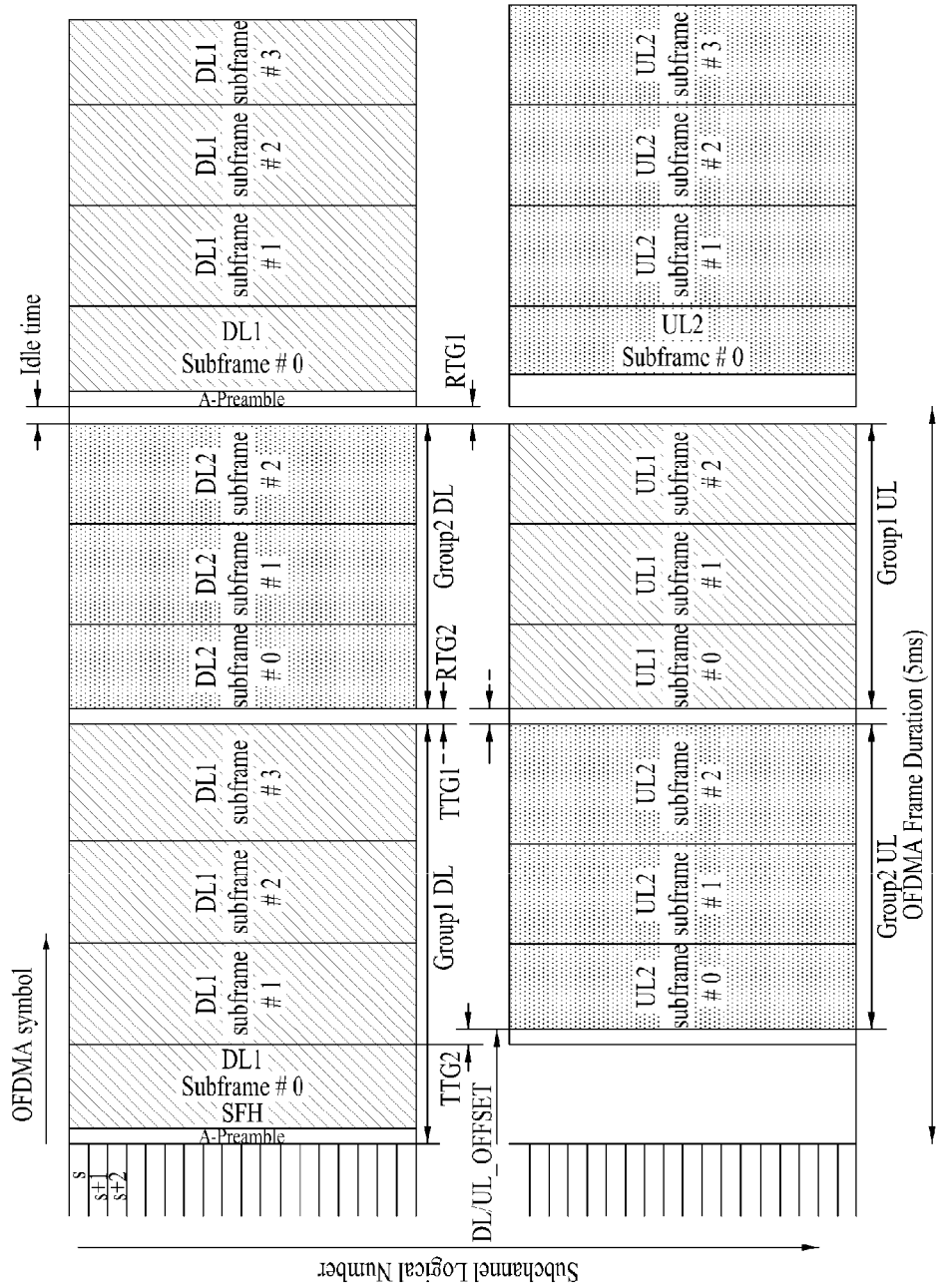
FIGS. 8 and 9 exemplarily illustrate the H-FDD frame structure for supporting the H-FDD MS through symbol puncturing in the AAI system acting as an example of a mobile communication system.
Figure 9:
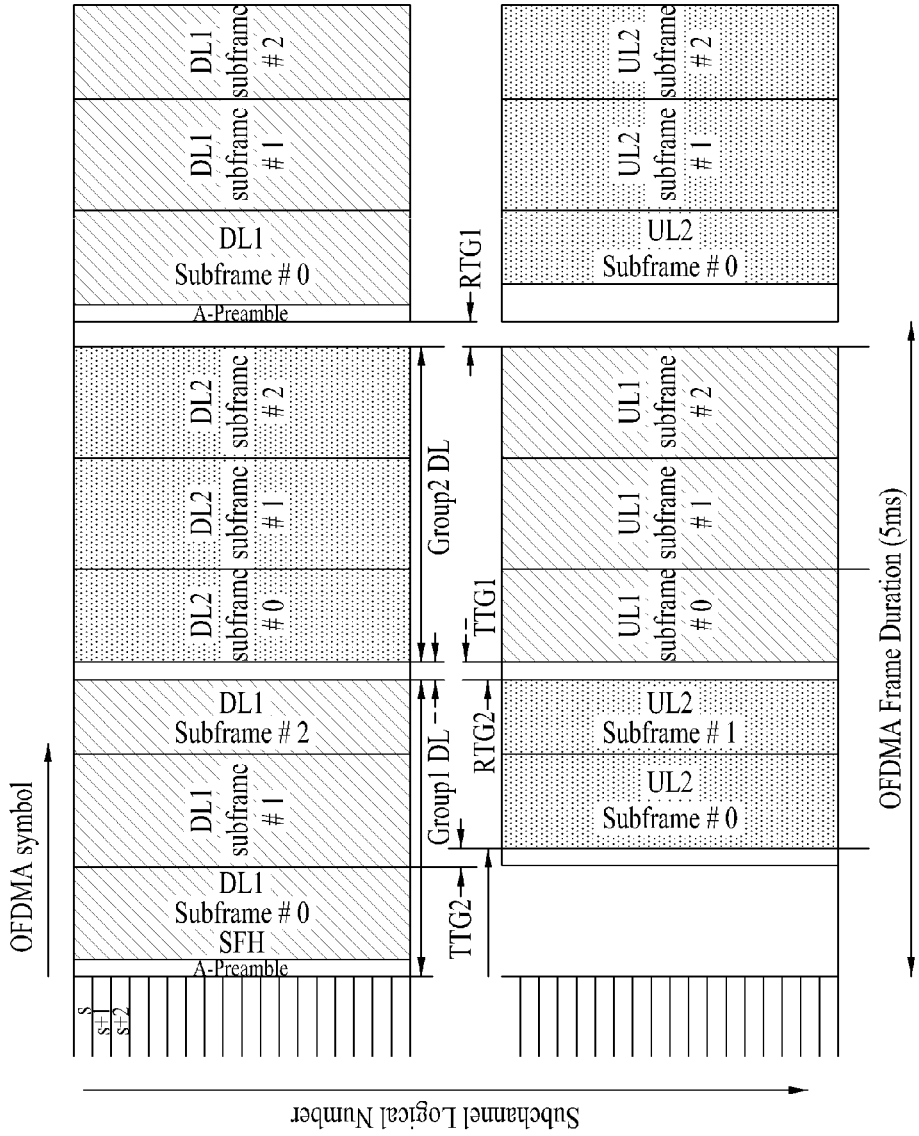

FIGS. 8 and 9 exemplarily illustrate the H-FDD frame structure for supporting the H-FDD MS through symbol puncturing in the AAI system acting as an example of a mobile communication system.

FIGS. 8 and 9 illustrate the H-FDD frame structure for supporting the H-FDD MS in the FDD frame structure having a ⅛ CP length for the 8.75 MHz and 7 MHz channel bandwidth through the same symbol puncturing as in FIGS. 6 and 7. The FDD frame for the 8.75 MHz channel bandwidth is composed of a type-1 subframe and a type-2 subframe. Therefore, a subframe located between two groups may be a type-1 subframe or a type-2 subframe. When puncturing the symbol according to the type of subframes located at the switching direction, the number of available symbols is set to 5 or 6. In this case, the punctured symbol position may be the first or last one of subframes. In addition, the FDD frame for use in the 7 MHz channel bandwidth includes a type-1 subframe and a type-3 subframe. In this case, a type-1 subframe or a type-3 subframe may be located between two groups. Therefore, after puncturing one symbol, the number of symbols available in a subframe is set to 4 or 5. In the case where the H-FDD MS transmits signals using four symbols, data transmission efficiency is deteriorated so that it is more preferable that 5 symbols be used. That is, the H-FDD frame structure may be configured in such a manner that one symbol for the type-1 subframe is assigned for the idle time or punctured for the switching duration.

The H-FDD frame structure shown in FIGS. 6 to 9 are disclosed only for illustrative purposes, the scope of types and arrangement of subframes constructing each group and the scope of the DL/UL zones assigned to each group are not limited only to the examples of FIGS. 6 to 9. In addition, as previously stated in FIGS. 6 and 7, the H-FDD MS can recognize the start point of a frame using DL/UL_OFFSET. In this case, the DL/UL_OFFSET value may be differently established in individual frames, or may be decided for individual groups such that different DL/UL_OFFSET values can be transmitted to individual groups.

In the same manner as in the method for use in the H-FDD frame structure having a ⅛ CP length for the 5/10/20 MHz channel bandwidths shown in FIGS. 6 and 7, the last or first symbol of each subframe located between individual groups in a frame structure having a 1/16 CP length for the 5/10/20 MHz channel bandwidth may be assigned for the idle time or punctured for the DL/UL switching duration so as to support the H-FDD MS. The FDD frame having a 1/16 CP length is composed of a type-1 subframe and a type-2 subframe, and the number of available symbols after completion of symbol puncturing is differently established according to subframe types. In addition, as described above, the start point of uplink in preparation for downlink can be recognized using DL/UL_OFFSET.

Figure 10:
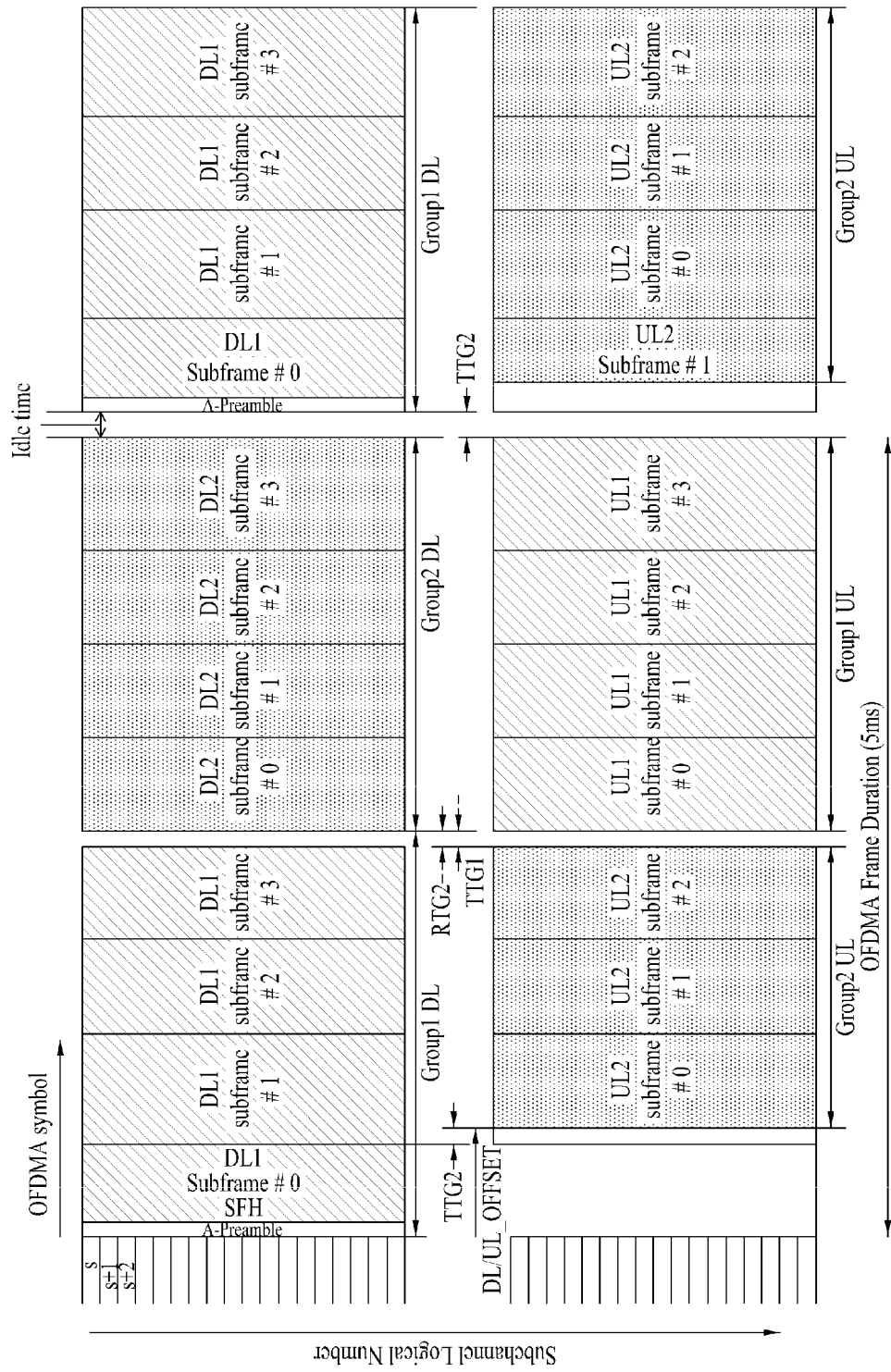
FIG. 10 exemplarily illustrates the H-FDD frame structure for supporting the H-FDD MS through symbol puncturing in the AAI system acting as an example of a mobile communication system.

FIG. 10 exemplarily illustrates the H-FDD frame structure for supporting the H-FDD MS through symbol puncturing in the AAI system acting as an example of a mobile communication system.

FIG. 10 shows the H-FDD frame structure for supporting the H-FDD MS for use in the FDD frame structure having a 1/16 CP length for 5/10/20 MHz channel bandwidths. In the same manner as in FIGS. 6 to 9, one symbol of a subframe located in the switching duration of the legacy FDD frame structure may be assigned for the idle time or punctured so as to support the H-FDD MS, such that the assigned or punctured symbol can be used for the DL/UL switching duration. Differently from the above-mentioned description, at least two symbols or one subframe may be assigned for the idle time or punctured so as to guarantee the DL/UL switching duration in such a manner that the H-FDD frame can be configured.

Figure 11:
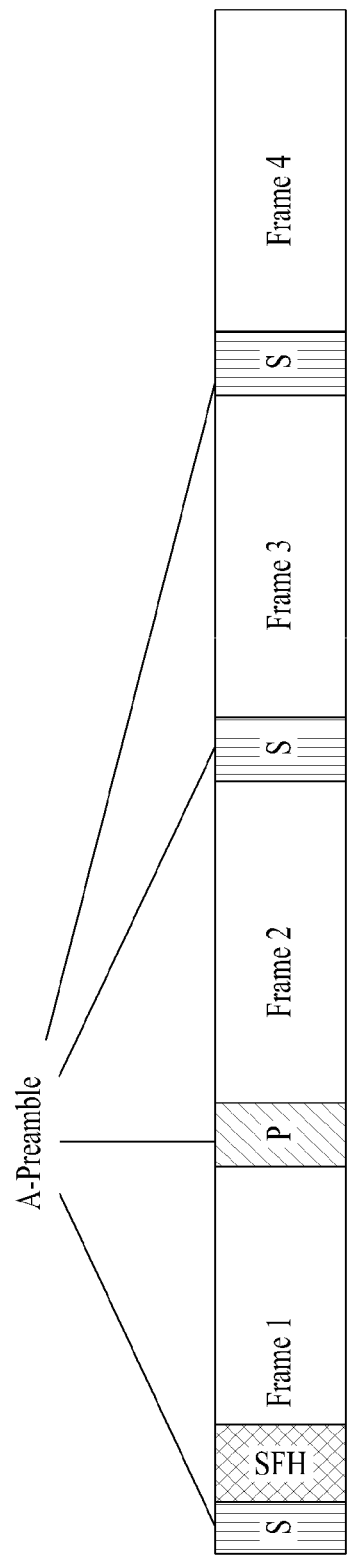
FIG. 11 exemplarily illustrates a superframe structure for use in the AAI system acting as an example of a mobile communication system.

FIG. 11 exemplarily illustrates a superframe structure for use in the AAI system acting as an example of a mobile communication system.

Referring to FIG. 11, according to the frame structure for use in the IEEE 802.16m system, one superframe includes four frames, and the BS transmits data to the MS in units of a superframe. Therefore, the H-FDD frame structure can inherit the predefined superframe structure. In this case, the MS has to receive significant signals (e.g., SFH, A-preamble, etc.) such as control information transmitted from the BS in the same manner as in the legacy superframe structure. The position of significant signals transmitted in each frame of one superframe is shown in FIG. 11.

The H-FDD MS has to receive significant signals (i.e., SFH, and A-preambles (i.e., primary A-preamble and secondary A-preamble)) from the BS irrespective of a group including the H-FDD MS. The MS can receive such signals through a first subframe of each frame as shown in FIG. 11. Therefore, in the case of an UL frame region of the H-FDD frame structure, a first UL subframe of each frame in which significant signals are transmitted needs to be assigned for the idle time or punctured in such a manner that H-FDD MSs contained in each group can receive all the significant signals transmitted from the BS. In the case where one subframe is punctured in each frame of the UL zone using the above-mentioned method, there may occur waste of resources.

In another method for transmitting significant signals such as control information to the H-FDD MS, the A-preamble transmitted in the third and fourth frames of the superframe can be retransmitted in the same manner as in the A-preamble (secondary A-preamble) transmitted in the first frame. The H-FDD MS corresponding to each group has to receive the SFH and the A-preambles (primary A-preamble and secondary A-preamble) from the BS, such that the same A-preambles transmitted in the third and fourth frames need not always be received.

Therefore, in order to allow the H-FDD MS to receive significant signals in the H-FDD frame structure, namely, in order to receive significant signals from the first and second frames of the superframe, the H-FDD frame structure can assign a UL subframe identical to the DL subframe used for transmission of the significant signals to the idle time or can also puncture the UL subframe to guarantee the idle time. In this case, one subframe of all the frames may be assigned for the idle time or punctured, such that the amount of wasted resources can be greatly reduced as compared to that of the H-FDD frame. However, the H-FDD MSs contained in Group 2 in the fourth and fourth frames cannot receive the significant signals (secondary A-preamble), resulting in reduction in communication throughput.

In this case, the H-FDD MSs contained in Group 1 can receive all the significant signals transmitted in the third and fourth frames such that it can receive all the significant signals transmitted in a superframe. However, the H-FDD MSs contained in Group 2 cannot receive significant signals through the third and fourth frames, such that unfairness may unexpectedly occur in receiving significant signals between groups. In order to solve the unfairness problem, a first subframe of each of the first and second frames may be assigned for an idle time or punctured, and the unfairness problem encountered in receiving such significant signals can be obviated using the switching between groups in the third or fourth frame.

For example, in the case of using the group switching in the fourth frame, for the H-FDD frame structure in the first, second, or fourth frame shown in FIG. 11, DL/UL frame allocation is achieved in the order of Group 1 and Group 2 in downlink, and DL/UL frame allocation is achieved in the order of Group 2 and Group 1 in uplink. In contrast, in the case of the third frame, DL/UL frame allocation is achieved in the reverse order through switching between groups, that is, DL/UL frame allocation is achieved in the order of Group 2 and Group in downlink and is also achieved in the order of Group 1 and Group 2 in uplink.

Therefore, in the case of performing the group switching, categories and numbers of significant signals received in the H-FDD MS of Group 1 are identical to those of significant signals received in the H-FDD MS of Group 2, resulting in implementation of fairness. The switching between groups enables the BS to transmit a group indicator to the H-FDD MS, such that the H-FDD MS can recognize that its own group has been changed to another group.

As described above, the IEEE 802.16m system has to support both the F-FDD MS and the H-FDD MS. In this case, the frame structure for supporting the H-FDD MS can be configured using the F-FDD frame structure defined for the legacy F-FDD MSs. Since the F-FDD frame structure is constructed in units of a subframe, the H-FDD frame structure for supporting the H-FDD MS can be configured in units of a subframe. H-FDD MSs are grouped into two groups in the same manner as in the H-FDD MSs of the legacy system, such that the H-FDD operation can be carried out. H-FDD MSs of each group require a transition gap for DL/UL switching in the H-FDD frame structure differently from the F-FDD MSs. In addition, in order to enable the H-FDD frame structure to be aligned with the legacy FDD frame structure in a straight line, it is necessary to establish a transition gap in the legacy FDD frame structure. For this purpose, a specific subframe may be assigned for an idle time or punctured.

The H-FDD frame structure may be configured using the legacy FDD frame structure such that it can support the H-FDD MS without affecting the F-FDD MS. The H-FDD frame structure has already been disclosed, which performs frame alignment with the predefined FDD frame structure using the above-mentioned frame structure such that it can support the H-FDD MS without affecting the MS utilizing the legacy FDD frame. The H-FDD frame structure requires the DL/UL switching duration allocated to each group, and needs to establish an idle time for the DL/UL (or UL/DL) switching in the DL or UL zone. In this case, a gap assigned to the DL/UL switching direction without affecting the F-FDD MS is configured in units of a subframe. The subframe assigned for DL/UL switching may be located in the DL or UL zone. In this case, a transition gap between groups is present in the DL or UL zone according to the position of a subframe to be allocated or punctured for the idle time. Therefore, a gap for the switching duration exists between two groups, and the H-FDD frame time-aligned with the FDD frame structure at 5/10/20 MHz channel bandwidths are shown in FIGS. 12 and 13.

Figure 12:
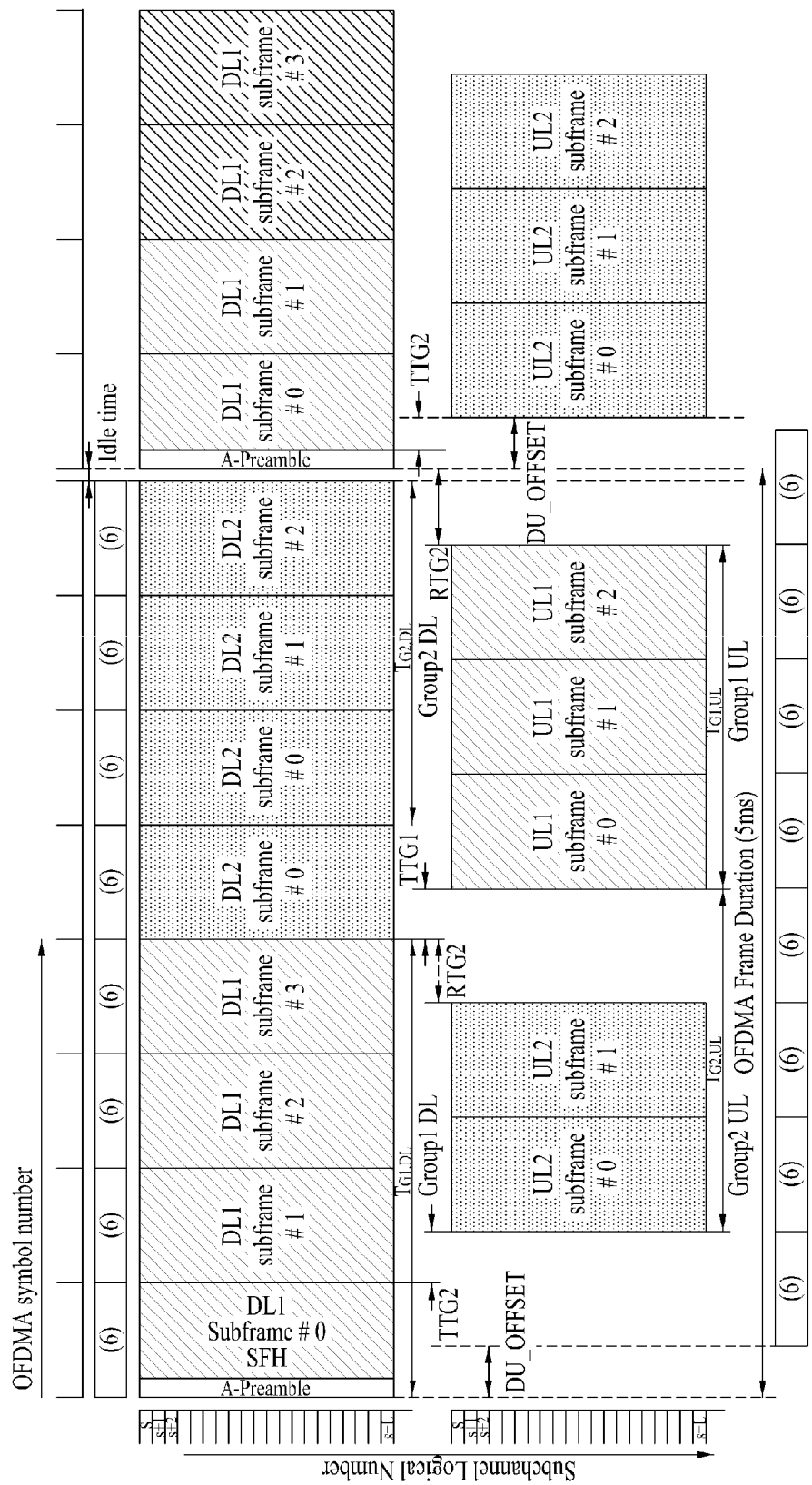
FIGS. 12 and 13 exemplarily illustrate the H-FDD frame structure used when DLgap or ULgap is not present in the AAI system acting as a mobile communication system.
Figure 13:
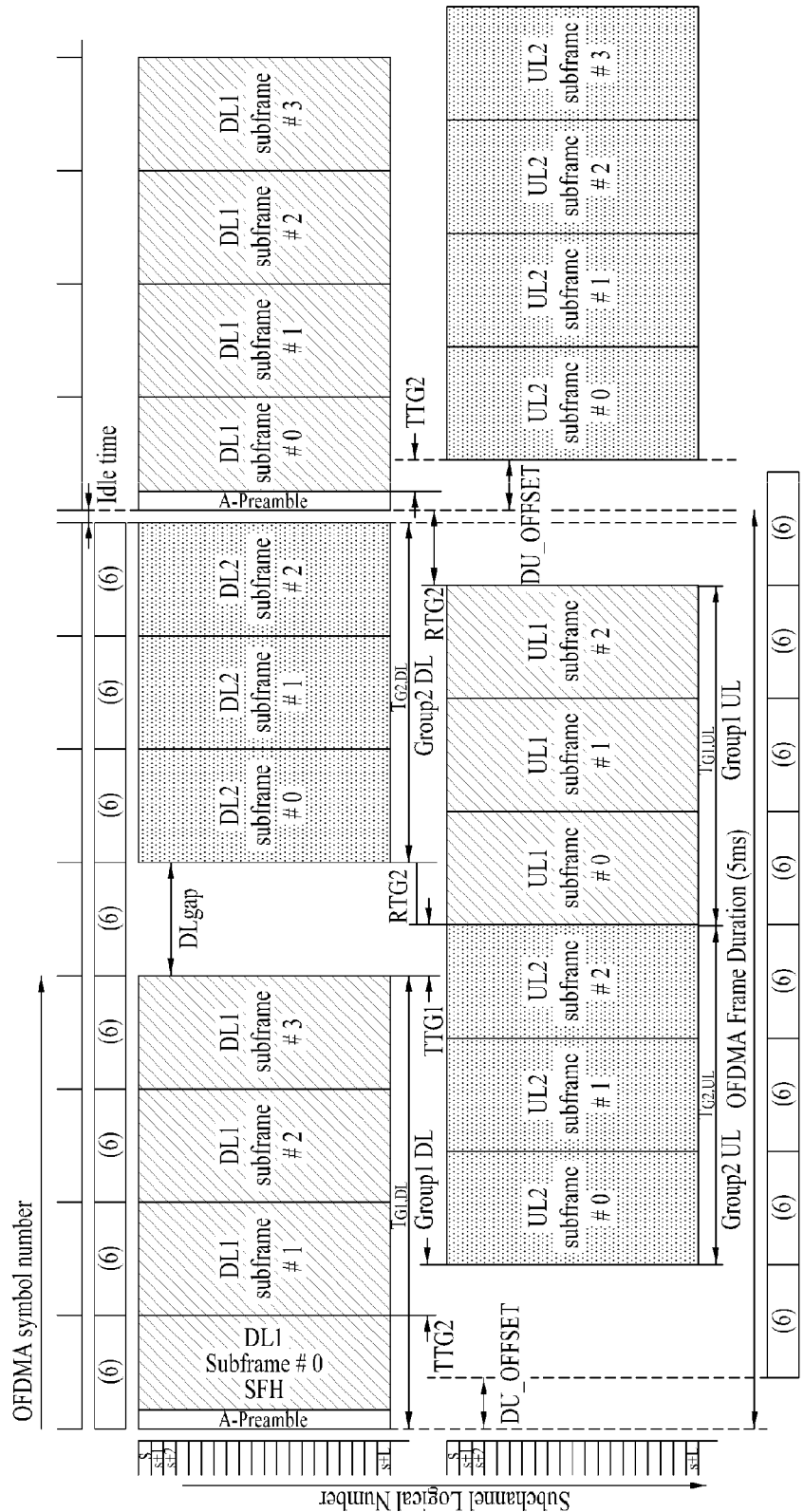

FIGS. 12 and 13 exemplarily illustrate the H-FDD frame structure used when DLgap or ULgap is not present in the AAI system acting as a mobile communication system.

The FDD frame at 5/10/20 MHz channel bandwidths is composed of a type-1 subframe, such that a subframe assigned for the idle time is a type-1 subframe. In this case, the position of a subframe to be allocated or punctured for the idle time may be differently established according to the length of a region allocated to two groups. Therefore, the H-FDD frame structure shown in FIGS. 12 and 13 is disclosed only for illustrative purposes, and the position of a subframe to be punctured or allocated for the idle time is not limited thereto.

Referring to FIG. 12, the DL/UL switching gap of H-FDD MSs may be assigned to an uplink subframe. Therefore, an idle time for such switching is established in the UL zone, such that a DLgap between two groups is not present in the DL zone. In this case, the number of subframes allocated for DL/UL switching in the UL zone should be set to at least two in consideration of reception of significant signals of the H-FDD MS, because the H-FDD structure for 5/10/20 MHz channel bandwidths is composed of a type-1 subframe as in the FDD frame structure and has to maintain frame alignment.

Contrary to FIG. 12, FIG. 13 shows that an idle time subframe is allocated to a DL zone for DL/UL switching. In this case, a gap between two groups is not present in the UL zone. In addition, for the DL/UL switching, one subframe may be assigned for an idle time or punctured in a DL or UL zone.

Information (e.g., subframe number, subframe position (or subframe index), and allocated region (DL or UL)) of subframes allocated for DL/UL switching of H-FDD MSs can be transmitted to the H-FDD MS or both the H-FDD MS and the F-FDD MS through the SFH or additional broadcast information (ABI). In case of the F-FDD MS, the H-FDD frame structure does not affect the legacy FDD structure, so that the F-FDD MS can transmit signals using the idle-time subframe or the punctured subframe.

Referring to FIGS. 12 and 13, 16m H-FDD MS belonging to each group has to receive important signals (e.g., SFH, A-preamble) from the BS. Therefore, in order to allow the H-FDD MS to receive such signals, no signals are transmitted in the UL zone overlapping with the DL zone (i.e., a first subframe of the frame) in which significant signals are transmitted. That is, the overlapping zone is established as an idle time. Accordingly, the H-FDD MS sets a first subframe of the frame to an idle time so as to receive such significant signals. However, in the 16m FDD frame structure, the H-FDD MS receives the A-preamble and SFH only in the first subframe of the first frame contained in the superframe, and receives only the A-preamble in the first subframe of the remaining frames of the superframe. As a result, setting the first subframe of the frame to the idle time by the H-FDD MS attempting to receive significant signals is far from efficient. Therefore, in order to reduce the idle time of the subframe, the BS transmits DU_OFFSET to the H-FDD MS such that it can utilize the uplink without puncturing the first subframe.

In this case, DU_OFFSET is a timing offset value from the start point of a DL frame to the start point of an UL frame. In this case, DU_OFFSET may have a positive or negative value according to the start position of an uplink frame compared to the start point of a downlink frame. For example, if the start point of the UL frame is earlier than the start point of the DL frame, DU_OFFSET has a negative value. In the remaining frames other than a first frame in the superframe, only the A-preamble excluding the SFH is transmitted, such that it is necessary to establish the idle time corresponding to a preamble reception time in the remaining frames over than subframes overlapping with the first subframe of a DL superframe in the UL zone.

Therefore, assuming that DU_OFFSET is established in consideration of the idle time, DU_OFFSET is set to 'TTG2+1 symbol duration' as shown in FIGS. 12 and 13, such that it can be transmitted to the H-FDD MS through the SFH or ABI. After the H-FDD MS receives DU_OFFSET from the BS, it can utilize the UL frame at a time spaced apart from a utilization time of the DL frame by a predetermined time corresponding to DU_OFFSET. Therefore, if the DU_OFFSET parameter is controlled, a first subframe need not be assigned for an idle time or punctured in the remaining frames other than the first frame, such that the UL zone can be more efficiently utilized. In addition, the FDD frame structure composed of subframes each including 6 symbols, is not affected, so that there is no influence upon the legacy F-FDD MS.

DU_OFFSET≥TTG2+PS_1Symbol
DU_OFFSET<Symbols_subframe×PS_1Symbol−RTG2
DU_OFFSET<Symbols_subframe×PS_1Symbol+ PS_Idle−RTG1)

In this case, PS_1Symbol is the number of PSs per symbol, and Symbols_subframe is the number of symbols per subframe.

The above-mentioned definition can be represented by the following symbol levels.

DU_OFFSET≥ceil(TTG2+PS_1Symbol, PS_1Symbol),
DU_OFFSET≤ceil(Symbols_subframe×PS_1Symbol− RTG2, PS_1Symbol),
DU_OFFSET≤ceil(Symbols_subframe×PS_1Symbol+ PS_Idle−RTG1, PS_1Symbol)

In this case, PS_1Symbol is the number of PSs per symbol, Symbols_subframe is the number of symbols per subframe, and ceil is a ceiling function for obtaining a high integer nearest to a decimal point.

In addition, timing parameters requisite for the switching between groups in the H-FDD frame structure can be defined as follows.

RTG1=Symbols_subframe×PS_1Symbol+Idle−TTG1
RTG2=Symbols_subframe×PS_1Symbol−TTG2
TTG1+RTG1=Symbols_subframe×PS_1Symbol+ PS_Idle
TTG2+RTG2=(Symbols_subframe−1)×PS_1Symbol In this case, TTG1 is denoted by 'TTG1≥α', α is a minimum TTG1 requisite for the frame, and TTG1 may be unchanged per frame and be transmitted as an SFH message on a physical slot (PS) basis.

In addition, TT2 is denoted by 'TTG2≥β'.

β is a minimum TTG2 requisite for the frame, TTG2 is unchanged per frame and is transmitted as an SFH message on a PS basis.

PS_1Symbol is the number of PSs per symbol, Symbols_subframe is the number of symbols per subframe, the number of symbols of a first type subframe is set to 6, the number of symbols of a second type subframe is set to 7, the number of symbols of a third type subframe is set to 5, and the number of symbols of a fourth type subframe is set to 9. In addition, PS_Idle can be denoted by 'PS_Idle=number of PSs per frame−Symbols_frame×PS_1Symbol'.

In addition, the H-FDD MS can recognize the start point of the UL zone using the DU_OFFSET value received from the BS through the SFH or ABI. In addition, MSs contained in each group can recognize information of the allocated frame region using other H-FDD frame parameters (for example, the number of subframes per group, configuration information, DLgap/ULgap, the size of a gap, the position of a gap, the position (or index) of punctured subframe, the number of punctured subframes, TTG1, TTG2, RTG1, RTG2, etc.).

The IEEE 802.16m system supports both the F-HDD MS and the H-FDD MS. In this case, the frame structure for supporting the H-FDD MS can be configured using the F-FDD frame structure defined for the legacy F-FDD MSs. Since the F-FDD frame structure is configured in units of a subframe, the H-FDD frame structure for supporting the H-FDD MS may also be configured in units of a subframe, and the H-FDD MSs are grouped into two groups as in the H-FDD MSs of the legacy system in such a manner that the H-FDD operation can be carried out. The H-FDD MSs belonging to each group requires a transition gap for DL/UL switching in the H-FDD frame structure, differently from the F-FDD MS. In addition, a subframe may be assigned for the idle time or punctured in the legacy FDD frame structure in such a manner that the H-FDD frame structure is frame-aligned with the legacy FDD frame structure, resulting in formation of a transition gap.

Figure 14:
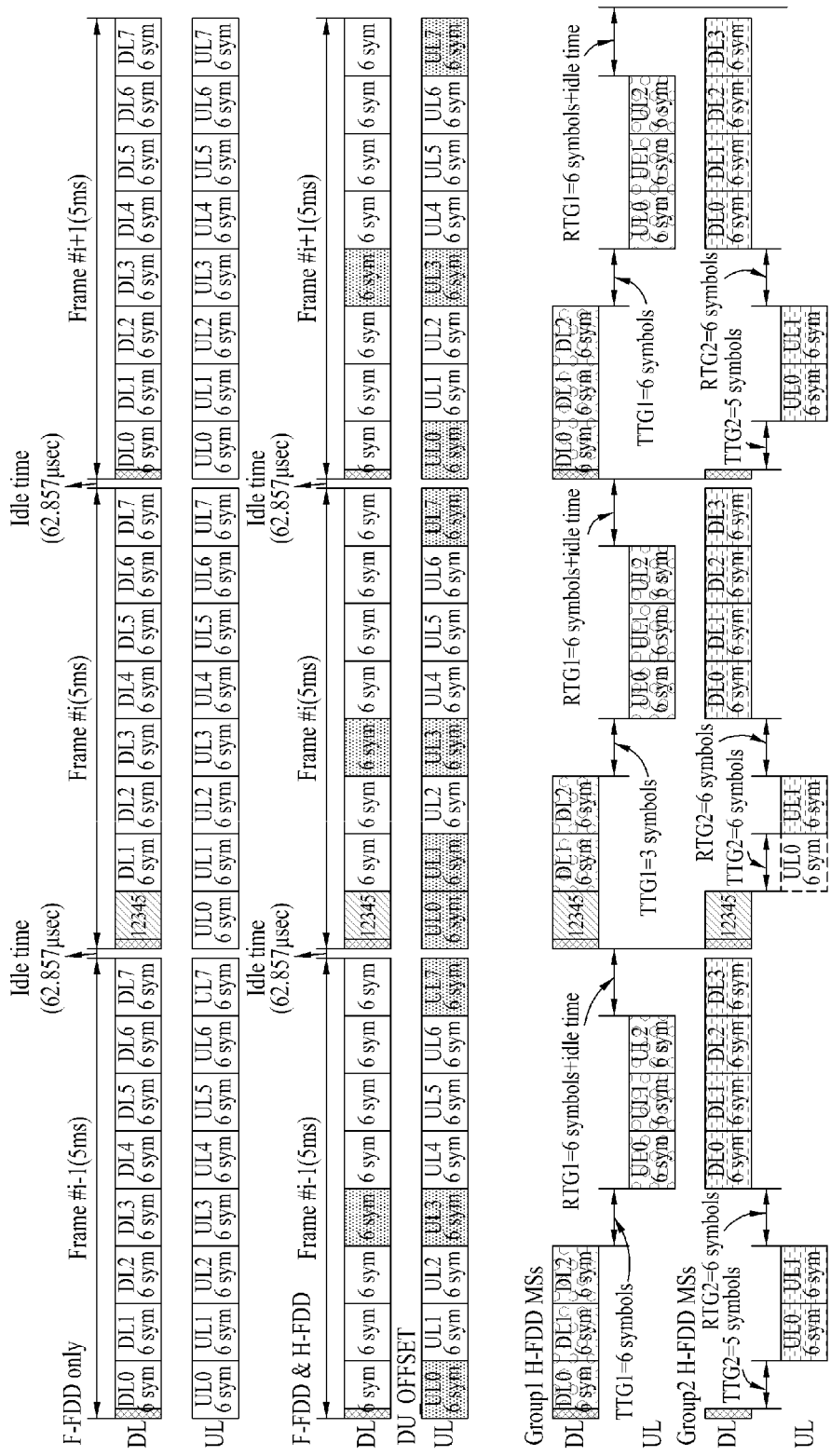
FIG. 14 exemplarily illustrates an H-FDD frame structure for allocating a subframe to a transition gap so as to maintain frame alignment with the F-FDD frame structure.

FIG. 14 exemplarily illustrates an H-FDD frame structure for allocating a subframe to a transition gap so as to maintain frame alignment with the F-FDD frame structure.

Referring to FIG. 14, for a transition gap of H-FDD MSs contained in two groups, a subframe located at the same position in the DL and UL zones is allocated to a transition gap. Namely, the subframe may be assigned to the idle time or punctured. For example, according to the H-FDD frame structure shown in FIG. 14, in order to obtain a TTG of a Group 1 H-FDD MS and an RTG of Group 2, a fourth subframe of each of the DL and UL zones is assigned to a gap region and punctured. The position of subframe punctured for a transition gap of H-FDD MSs contained in two groups is disclosed only for illustrative purposes, and the position of punctured subframe is not limited thereto. In addition, for an RTG of Group 1 H-FDD MS, the last subframe of the uplink is punctured and is assigned to a transition gap. All H-FDD MSs for each group must receive the A-preamble and the SFH from the BS, and the UL subframe located at the same position as that of a subframe to which the A-preamble and the SFH are transmitted in the DL zone must be operated as an idle time or punctured. Therefore, a first UL subframe located at the same position of the subframe to which the A-preamble and the SFH are transmitted in the UL zone is punctured. The frame to which the SFH is transmitted considers a transition gap for data transmission after receiving the SFH, and a subframe UL1 located at the second subframe in the UL zone can be punctured in consideration of the transition gap. Therefore, in the frame to which the SFH is transmitted, a first UL subframe UL0 and a second UL subframe UL1 are punctured.

If RTG of Group 1 H-FDD MS is equal to or shorter than the idle time in FIG. 14, the last subframe UL7 from among the punctured subframes for the transition gap can be used without being punctured. Therefore, if the idle time is sufficiently long to be used as the UL-to-DL transition gap, Group 1 H-FDD MSs may use four subframes (UL4, UL5, UL6, UL7) for data transmission in the UL zone. Each Group 2 H-FDD MS for use in the frame to which SFH is transmitted transmits data to the BS using UL subframes smaller in number than other frames receiving no SFH by one in consideration of not only SFH reception in a frame to which SFH is transmitted but also a transition gap after the SFH reception. As can be seen from FIG. 14, Group 1 H-FDD MS can transmit data to the BS using two UL subframes in a frame to which no SFH is transmitted, and can transmit data to the BS using one UL subframe in a frame to which SFH is transmitted. Alternatively, in order to maintain the same number of UL subframes in all frames, the subframe UL0 may not be used in all frames of Group 2.

If a transition gap (TTG or RTG) for DL/UL switching of H-FDD MSs contained in each group is equal to or shorter than the length of one symbol, some symbols of a subframe punctured for a transition gap of two groups may be used for data transmission. That is, the subframe is not punctured for a transition gap, one symbol of a subframe including the gap is assigned to a gap and the subframe is composed of the remaining symbols. For example, a DL subframe composed of 5 symbols may be assigned to the position subsequent to the subframe DL2 of Group 1 as shown in FIG. 14. Alternatively, a DL subframe composed of 5 symbols may be assigned to the position prior to the subframe DL0 of Group 2.

In order to support the H-FDD MS, the H-FDD MS can be supported using only one group of H-FDD frame structures for two groups shown in FIG. 14. For example, only the H-FDD frame structure of Group 1 shown in FIG. 14 may be used as necessary. Therefore, the H-FDD frame structure for supporting the H-FDD MS is configured in the same manner as in the frame structure of Group 1 as shown in FIG. 14. In this case, for the transition gap, a fourth subframe DL3 and the last UL subframe UL7 are punctured to guarantee a transition gap. Therefore, the ratio of the number of DL subframes of the H-FDD MS to the number of UL subframes of the H-FDD MS is set to 3:3.

However, assuming that the idle time of the FDD frame structure is long enough to include RTG, the last subframe of the UL zone need not be punctured for the transition gap. Therefore, the ratio of the number of DL subframes to the number of UL subframes is set to 3:4. Therefore, the ratio of the number of DL subframes for the H-FDD MS to the number of UL subframes for the H-FDD MS is changed according to the position of a DL subframe punctured for TTG and information as to whether the last UL subframe is punctured.

As can be seen from FIG. 14, in the case of supporting the H-FDD MS using the subframe puncturing, the F-FDD MS is not affected at all, and the F-FDD MS can transmit/receive data using all subframes on downlink/uplink in the same manner as in the case 'F-FDD only case' shown in FIG. 14. However, if one symbol is punctured in downlink for a transition gap of the H-FDD MS, the F-FDD MS also has to use the subframe composed of 5 symbols in which one symbol is punctured in the DL zone. Accordingly, there is a need for the BS to transmit such frame configuration information, etc. to all MSs.

Differently from FIG. 14, the position of a transition gap for DL/UL switching of H-FDD MSs contained in two groups in the H-FDD frame structure can be established in different ways according to H-FDD MSs of each group.

Figure 15:
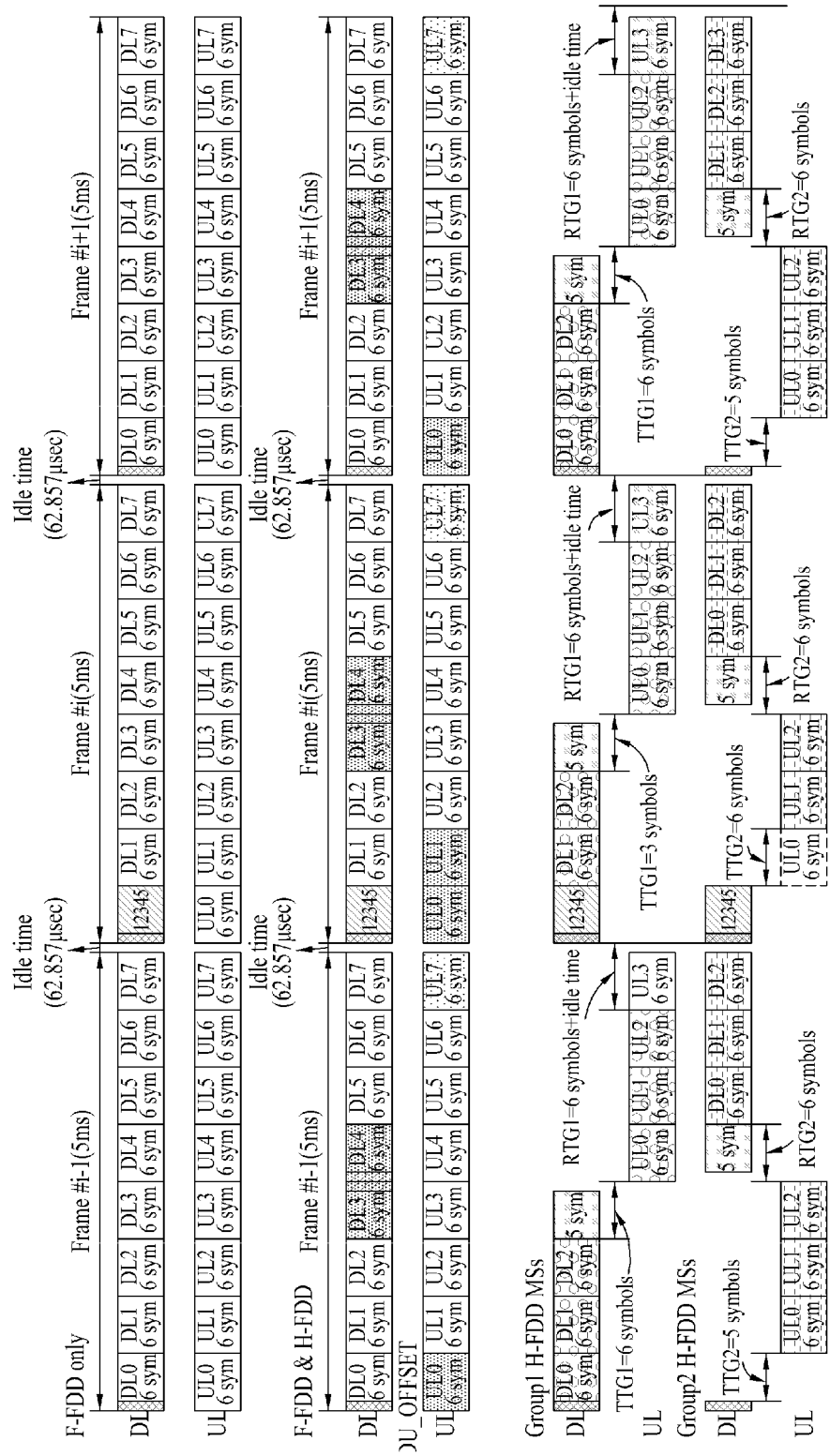
FIG. 15 exemplarily illustrates an H-FDD frame structure for supporting an H-FDD MS in the AAI system acting as a mobile communication system.

FIG. 15 exemplarily illustrates an H-FDD frame structure for supporting an H-FDD MS in the AAI system acting as a mobile communication system.

The H-FDD frame structure for Group 1 H-FDD MSs is achieved by puncturing a fourth DL subframe DL3 and a seventh UL subframe UL7 so as to obtain a transition gap as shown in FIG. 15. The H-FDD frame structure for Group 2 H-FDD MSs is achieved by puncturing a fifth DL subframe DL4 so as to obtain a transition gap. In addition, in order to allow the H-FDD MS to receive the A-preamble or the SFH transmitted in a first DL subframe, the H-FDD frame structure is configured in a manner that the first UL subframe UL0 can be punctured, and is also configured in a manner that a second UL subframe Ul1 is additionally punctured in consideration of a transition gap in the frame in which the SFH is transmitted. Therefore, according to the H-FDD frame structure for Group 1 H-FDD MSs shown in FIG. 15, the H-FDD frame structure is composed of 3 subframes (DL0, DL1, DL2) on downlink and is composed of 3 subframe (UL4, UL5, UL6) on uplink.

In this case, if RTG for Group 2 is equal to or shorter than the idle time, the last UL subframe need not be punctured, such that the uplink may be comprised of four subframes (UL4, UL5, UL6, UL7). In case of the frame structure for Group 2 H-FDD MSs, a DL frame is composed of 3 subframes (DL5, DL6, DL7) in consideration of the above-mentioned subframe puncturing, an UL frame corresponding to the same timing point as that of the DL frame to which SFH is transmitted is composed of two subframes (UL2, UL3), and another UL frame corresponding to a DL frame to which only the A-preamble excluding the SFH is transmitted is composed of 3 subframes (UL UL2, UL3). In this case, the subframe index indicates a subframe index of the F-FDD frame structure, and may be re-indexed for the H-FDD frame structure. The above-mentioned H-FDD frame structure is disclosed only for illustrative purposes, and the configuration of the H-FDD frame structure for supporting each group H-FDD MS may be changed according to the position of a subframe punctured for the transition gap. In addition, the H-FDD MSs are not classified into two groups, and it is possible to support the H-FDD MSs using only the H-FDD frame structure for only one group in individual H-FDD frame structures formed for two groups shown in FIG. 15. In addition, in order to maintain the same number of UL subframes in all frames, the subframe UL0 may not be used in all frames of Group 2.

If a transition gap (TTG, RTG) for DL/UL switching of H-FDD MSs contained in each group is equal to or shorter than the length of one symbol, some symbols of the subframe punctured for a transition gap of two groups may be used. That is, in the H-FDD frame structure, the subframe is not punctured for the transition gap, and one symbol of the subframe is assigned to a gap such that the subframe can be composed of the remaining symbols. For example, the H-FDD frame structure shown in FIG. 15, instead of puncturing two contiguous subframes DL3 and DL4 in the DL frame for the H-FDD MS of two groups, may construct a subframe by puncturing the last symbol from among two contiguous subframes in the first subframe from among two contiguous subframes, and may also construct a subframe by puncturing a first symbol in the second subframe. One symbol of a type-2 subframe composed of 6 symbols is punctured so that the type-2 subframe is changed to a type-3 subframe. In this case, two kinds of type-3 subframes are created according to the positions (e.g., a first symbol and the last symbol) of symbols punctured in the type-1 subframe. Two kinds of type-3 subframes are configured using the type-1 subframe composed of 6 predefined symbols, and the newly-formed type-3 subframe has a pilot pattern in which the first symbol or the last symbol is punctured in the pilot structure of the predefined type-1 subframe as shown in FIG. 16.

Figure 16:
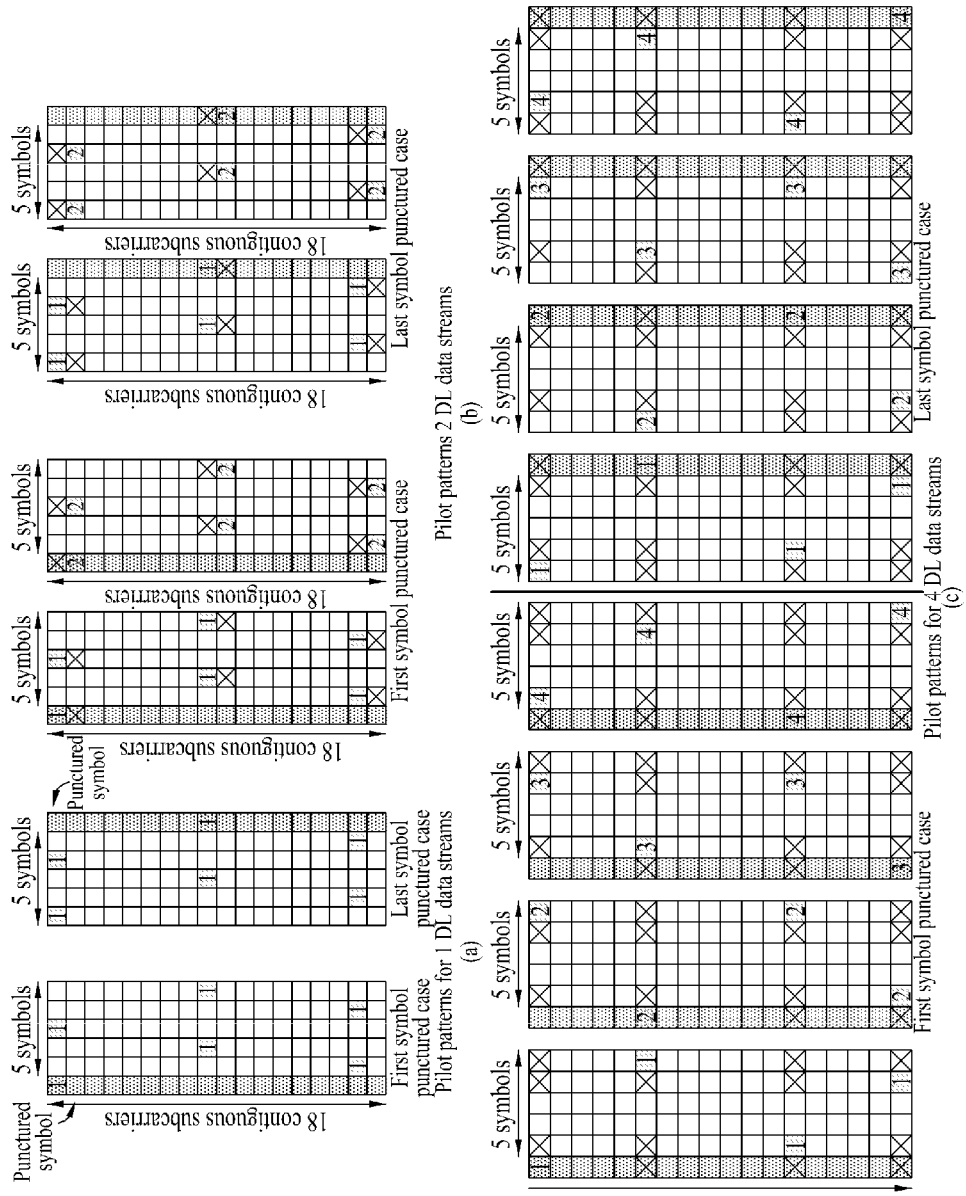
FIG. 16 exemplarily illustrates a pilot pattern for a Type-3 subframe in the AAI system acting as a mobile communication system.

FIG. 16 exemplarily illustrates a pilot pattern for a Type-3 subframe in the AAI system acting as a mobile communication system.

Under the condition that a pilot pattern of a legacy type-1 subframe is an interlaced pilot pattern formed by cyclic shifting of a base pilot pattern, the pilot pattern of the newly-formed type-3 subframe may utilize a pilot pattern formed by puncturing the first or second symbol in the same manner as in FIG. 16.

Referring to FIG. 16(c), four DL data streams for use in the H-FDD frame structure are designed by optimization of pilot overhead. In case of generating a type-3 subframe composed of 5 symbols by puncturing the first or last symbol of a type-1 subframe, the pilot contained in the punctured symbol cannot be used for channel measurement, resulting in reduction in system performance. Therefore, in the case of using four DL data streams, if a type-3 subframe is generated by puncturing one symbol of the type-1 subframe so as to allocate a transition gap in the H-FDD frame structure, the following cases can be used and a detailed description thereof will hereinafter be described in detail.

1. Case in which first symbol of type-1 subframe is punctured:

After first and second symbols of the type-1 subframe are shifted to the right by one OFDMA symbol, a first OFDMA symbol of the type-1 subframe is punctured in such a manner that a type-3 subframe can be formed and used. On the other hand, after third and fourth OFDMA symbols of the type-1 subframe are first punctured, second symbols are shifted to the right by one OFDMA symbol such that a type-3 subframe can be formed and used.

2. Case in which last symbol of type-1 subframe is punctured:

Fifth and sixth symbols of the type-1 subframe are shifted to the left by one OFDMA symbol, and the last OFDMA symbol of the type-1 subframe is punctured so that a type03 subframe can be formed and used. Alternatively, after third and fourth OFDMA symbols of the type-1 subframe are first punctured, fifth and sixth symbols are shifted to the left by one OFDMA symbol so that a type-3 subframe can be formed and used.

In this case, as can be seen from the H-FDD frame structure of FIG. 15, the type-3 subframe formed by puncturing a first symbol of the subframe is located at the position of the first subframe of a DL frame of Group 2, and a type-3 subframe formed by puncturing the last symbol of the type-1 subframe is located at the last subframe of a DL frame of Group 1. Differently from the above-mentioned structure in which the subframe is punctured, a DL frame for each group further includes a type-3 subframe such that the DL frame is composed of four subframes. In order to support the H-FDD MS, it is possible to support the H-FDD MS using only the frame structure of one group from among H-FDD frame structures of two groups. Instead of puncturing the subframe as described above, if the symbol is used as a switching gap such that a subframe composed of 5 symbols exists in downlink, the F-FDD subframe located at the same position is also composed of 5 symbols.

Assuming that the legacy H-FDD MS exists, in the FDD frame structure divided into two zones to support the legacy H-FDD MS and the 16m FDD MS, the legacy zone is allocated to the legacy H-FDD MS and the 16m zone is allocated to the 16m FDD MS in such a manner that the frame can be configured. In this case, the legacy zone allocated for the legacy H-FDD MS and the 16m zone allocated for the 16m MS may be fixed or be flexibly changed as necessary. Information regarding individual zones may be signaled from the BS to the MS.

Figure 17:
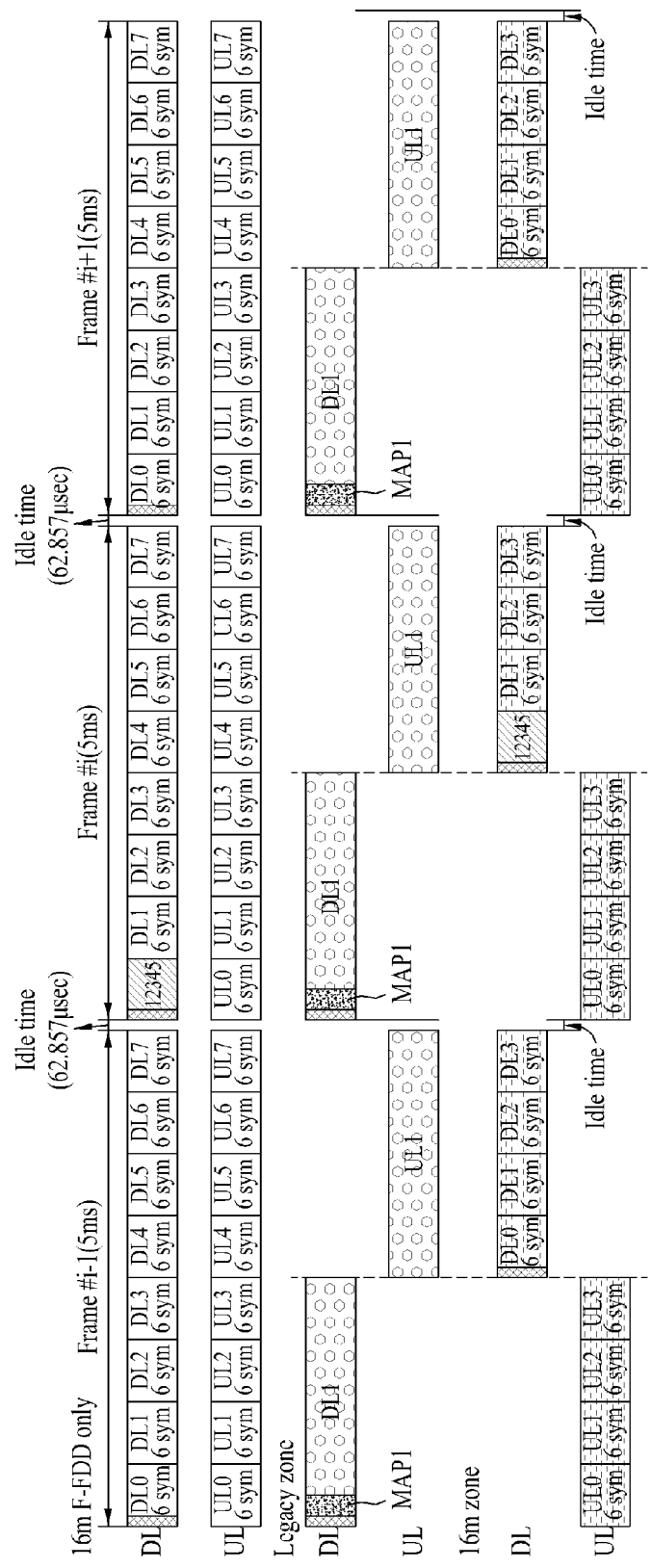
FIG. 17 exemplarily illustrates an FDD frame structure for supporting the legacy H-FDD MS in the AAI system acting as a mobile communication system.

FIG. 17 exemplarily illustrates an FDD frame structure for supporting the legacy H-FDD MS in the AAI system acting as a mobile communication system.

Referring to FIG. 17, the 16m FDD MS and the H-FDD MS may use the 16m zone, and the legacy H-FDD MS may use the legacy zone. In this case, the 16m F-FDD MS can utilize all resources of the 16m zone, and the H-FDD MS is designed in such a manner that a fourth UL subframe is punctured for a transition gap. In addition, if the idle time is shorter than a TTG requisite for the H-FDD MS, the H-FDD frame structure is configured in such a manner that the last DL subframe (DL3) is punctured for a transition gap.

In addition, the last symbol of a fourth UL subframe may be assigned to an H-FDD switching duration, differently from the above-mentioned example. If the FDD idle time is shorter than a TTG, the last symbol of a fourth DL subframe may be assigned to a switching duration.

Figure 18:
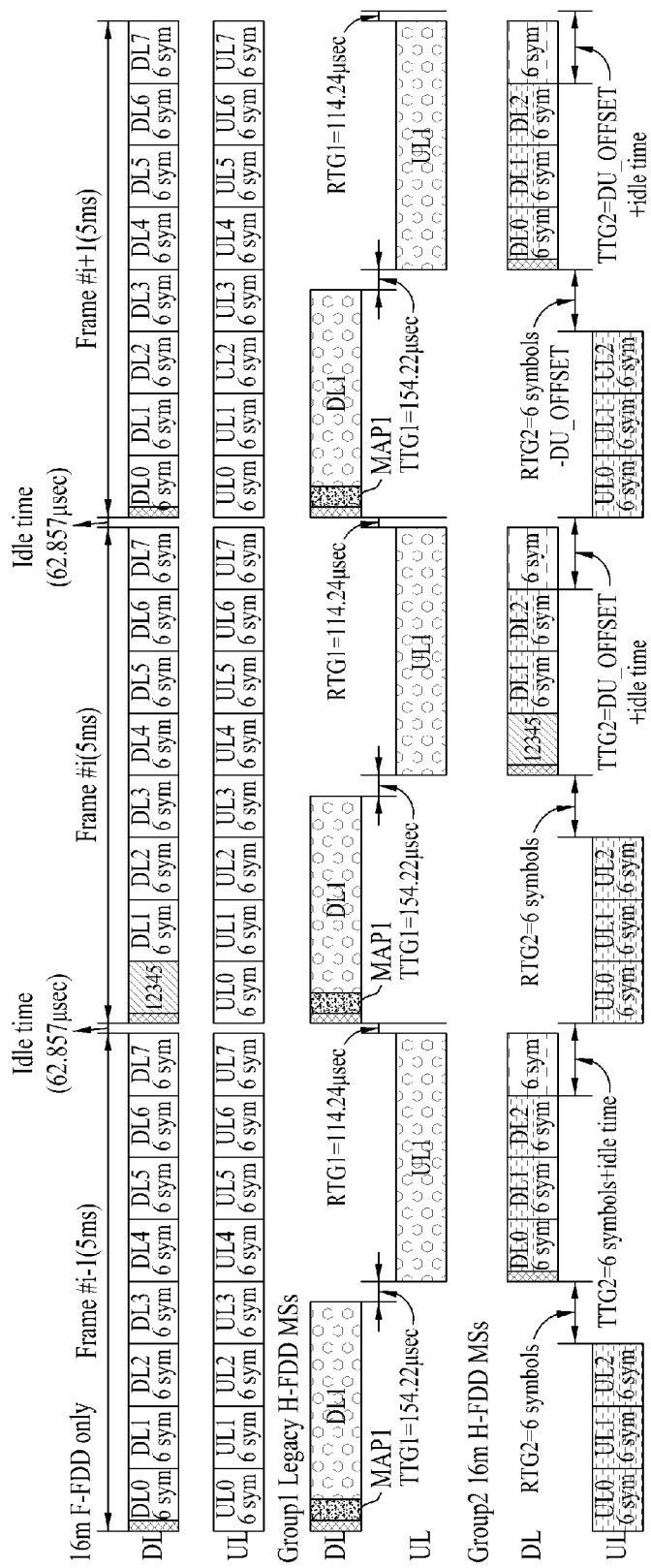
FIG. 18 exemplarily illustrates an H-FDD frame structure for supporting the legacy MS in the AAI system acting as a mobile communication system.

FIG. 18 exemplarily illustrates an H-FDD frame structure for supporting the legacy MS in the AAI system acting as a mobile communication system.

Another frame structure for supporting the legacy MS and the 16m FDD MS is shown in FIG. 18. For example, the H-FDD frame structure may include three or more DL subframes allocated to the legacy zone supporting the legacy system, and may include the DL/UL switching duration in a predetermined subframe. Therefore, the length of a DL zone allocated to the legacy system can be represented as follows.

3×Length of subframe≤Length of Group 1 DL zone+TTG1

Length of Group 1 DL length≤4×Length of subframe

The DL zone for the legacy H-FDD MS satisfies the above-mentioned range, and may be allocated on a symbol basis. The UL zone may be allocated to the position between a current frame and the next frame simultaneously while having a gap corresponding to RTG1. Alternatively, the UL zone may be allocated within the range extended to the last UL subframe position of the F-FDD.

For the H-FDD DL/UL transition gap within the 16m zone allocated for the 16m F-FDD and H-FDD MSs, a fourth UL subframe UL3 may be punctured and used as a gap. In addition, the last DL subframe is punctured for a TTG such that it is used as a transition gap. Therefore, in order to allocate the H-FDD frame structure transition gap used by the 16m H-FDD MS operated in the 16m zone, the last DL subframe DL7 and the fourth UL subframe UL3 are punctured. In this case, the subframe index shown in the above-mentioned description indicates an index for use in the F-FDD frame structure. In addition, assuming that the DL and UL zones for use in the legacy H-FDD frame structure shown in FIG. 18 are properly adjusted, and the legacy transition gap is present in the third subframe, the 16m zone is configured in a manner that downlink is started in the order of the subframes (UL0 and UL1) for UL signal transmission third subframe UL2 punctured.

Figure 19:
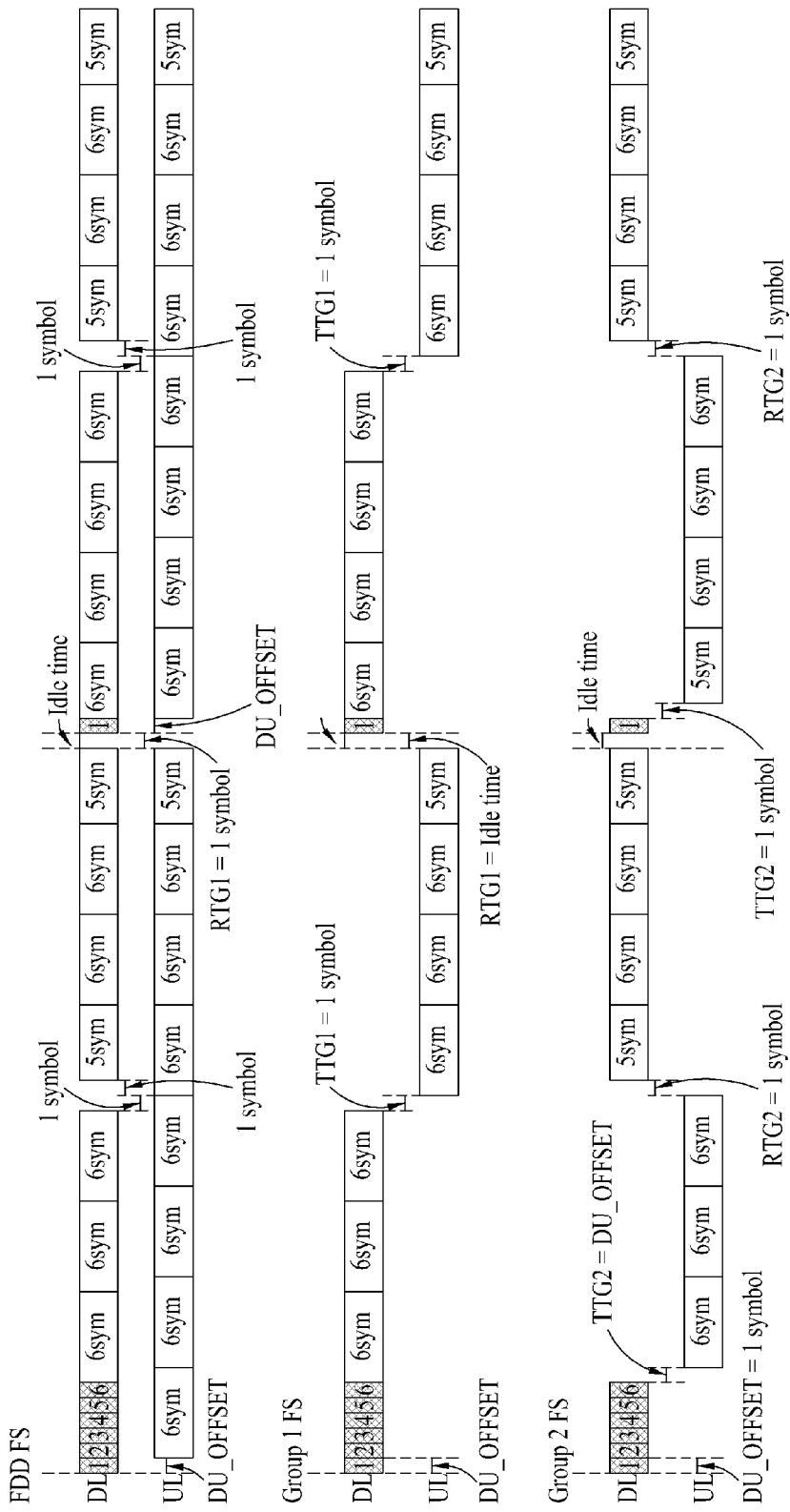
FIG. 19 exemplarily illustrates an H-FDD frame structure for supporting a 16m H-FDD MS in the AAI system acting as a mobile communication system.

Referring to FIG. 19, if a TTG of a frame structure of the 16m zone allocated for the 16m FDD MS is equal to or shorter than the idle time, a frame can be configured in a manner that the last subframe DL7 is not punctured for the transition gap. In this case, the number of DL subframes allocated for the 16m FDD MS is higher than that of the legacy subframe puncturing by one (i.e., the number of DL subframes is set to 4). In this case, the ratio of the number of DL subframes to the number of UL subframes is set to 4:3.

In FIG. 18, there is no need for the 16m F-FDD MS to use the transition gap, such that the 16m F-FDD MS can use subframes (i.e., DL4 subframe, DL5 subframe, DL6 subframe, and DL7 subframe) of the remaining DL zones other than the DL zone allocated to the legacy H-FDD MS. In the UL zone, UL0 subframe, UL1 subframe, and UL2 subframe can be used in the same manner as in the 16m H-FDD MS. However, if the legacy UL zone does not use the UL3 subframe, the UL0 subframe, the Ul1 subframe, the UL2 subframe, and the UL3 subframe can be used to transmit UL signals. In this case, the BS may perform scheduling or may perform signaling to the MS as necessary.

When supporting the 16m MS using the F-FDD frame structure, the H-FDD MS punctures some subframes for a transition gap in subframes of respective zones used by the F-FDD MS, such that it can receive data using the 16m zone frame structure shown in FIG. 18.

FIG. 19 exemplarily illustrates an H-FDD frame structure for supporting a 16m H-FDD MS in the AAI system acting as a mobile communication system.

Differently from the FDD frame structure, the H-FDD frame structure requires a transition gap for DL/UL switching. In order to generate a transition gap in the legacy FDD frame structure, some symbols of the subframe may be assigned for the idle time or be punctured. In the H-FDD frame structure, the idle time for the DL/UL switching of the H-FDD MS is punctured at a symbol level, such that the H-FDD MS can transmit and receive data using the subframe composed of a smaller number of symbols than the subframe of the legacy FDD frame structure by one. For example, the FDD frame structure having a ⅛ CP length for 5/10/20 MHz channel bandwidths includes a type-1 subframe composed of 6 symbols. Therefore, if the symbol level puncturing is performed to construct the H-FDD frame, the subframe to which the symbol level puncturing is applied is changed to a type-3 subframe composed of 5 symbols. In addition, the symbol assigned for the idle time or punctured through the symbol level puncturing in the subframe is located at the position of the first or last symbol. However, the above-mentioned description is disclosed only for illustrative purposes for more understanding of frame alignment with the FDD frame, and the position of symbols punctured in the legacy subframe to construct the H-FDD frame structure is not limited thereto.

In this case, the punctured subframe may be located in the DL or UL zone. The idle time created to establish the DL/UL transition gap may be established only in the DL or UL zone, or may also be established in both the DL zone and the UL zone. For example, if the idle time is established only in the DL zone, a transition gap is established between DL zones of two groups. In this case, each of the last symbol of the last subframe of Group 1 and a first symbol of a first subframe of Group 2 is assigned to an idle time, such that a necessary gap is formed. Therefore, each of the last subframe of Group 1 and the first subframe of Group 2 includes a smaller number of symbols than other subframes by one.

In the zone allocated to each group, one or N symbols may be allocated to the transition gap. For example, if N symbols are allocated, one symbol is excluded from among N subframes existing in the allocated zone in such a manner that the subframe can be configured. That is, a subframe composed of N−1 symbols exists in the allocated zone. For example, a type-3 subframe composed of 5 symbols may exist in the allocated zone. In addition, as many symbols as the number of symbols required for forming the transition gap are allocated to each group zone, and the subframe is composed of the remaining symbols such that the H-FDD MS can be supported using the resultant subframe. For example, if four subframes each including 6 symbols are allocated to the DL zone of Group 1 and two symbols are allocated for a transition gap, a DL zone of Group 1 includes two subframes each including 6 symbols and two subframes each including 5 symbols. In addition, all the necessary symbols are allocated to one subframe such that the DL/UL switching duration can be generated.

A method for puncturing symbols to establish the idle time for the DL/UL switching in the DL zone can also be applied to the UL zone. If one symbol is punctured in the UL subframe, a subframe composed of a smaller number of symbols by one is formed. For example, in the FDD frame structure having a ⅛ CP length for 5/10/20 MHz channel bandwidths, each UL subframe is composed of 6 symbols. However, if symbols are allocated to a transition gap through symbol level puncturing, a subframe composed of 5 symbols is created. Therefore, an uplink control channel composed of 5 symbols is defined and used. Therefore, if symbols are allocated to a transition gap for the DL/UL switching in the DL zone, the number of symbols contained in the subframe is reduced by one, such that it is necessary to define/use a new-type UL control channel.

If the DL/UL switching duration (i.e., TTG or RTG) of the H-FDD MS is longer than one symbol, one or more symbols are allocated to TTG and RTG using the above-mentioned symbol puncturing. Therefore, when forming the H-FDD frame structure using the symbol level puncturing, N symbols are allocated to form a gap requisite for transition in the subframe, such that a subframe composed of (n−1) symbols is created. In addition, N symbols can be allocated to one or more subframes.

In order to form a transition gap, the position of a subframe (i.e., a subframe having a smaller number of symbols than those of the legacy subframe, for example, a subframe composed of 5 symbols) formed by allocating one or more symbols to the idle time is not limited only to the DL/UL zone.

In the case in which a transition gap requisite for the H-FDD frame structure is formed at a symbol level, the 16m H-FDD MS has to receive significant signals (for example, SFH, A-preamble, etc.) from the BS. In this case, the SFH is transmitted only in the first subframe of the superframe, and only the A-preamble is transmitted in the first subframe of each of the second, third, and fourth frames of the superframe. Therefore, in order to receive significant signals, the H-FDD MS may allocate the UL zone overlapping with the DL zone in which the significant signals are transmitted to the idle time, or no signals are transmitted through the UL zone. Therefore, in order to allow Group 2 H-FDD MS to receive significant signals from the BS and transmit signals, it is necessary to additionally establish the idle time. For this purpose, it is necessary to establish a transition gap between groups and additional symbol allocation needs to be performed. Therefore, the 16m H-FDD MS prevents the puncturing of additional symbols formed after reception of significant signals using an offset value (DU_OFFSET), idle allocation of additional symbols is prevented from being generated, and it is possible to use subframes without generating symbols to be wasted upon reception of the A-preamble.

In this case, DU_OFFSET indicates a time difference between the start point of a DL frame and the start point of a UL frame, and may be indicated in units of a symbol or physical slot (PS). In this case, there is no limitation in values used for establishing DU_OFFSET, but each value must have a higher value than one symbol in consideration of symbols to be allocated for a transition gap after transmission of significant signals. In order to allow the H-FDD MS to use the subframe composed of 6 symbols after the H-FDD MS receives significant signals (e.g., A-preamble), there is a need for DU_OFFSET to be higher than the sum of a TTG and the length of one symbol to which a preamble is transmitted. As shown in FIG. 19, DU_OFFSET is established such that the timing point of a UL frame is shifted by the value of DU_OFFSET. Therefore, in order to allow the H-FDD MS to receive significant signals other than the SFH, some symbols need not be allocated to the idle time. If DU_OFFSET is established in consideration of the switching duration, it is not necessary to establish symbols for the switching duration and the significant signals, such that the H-FDD MS can transmit data using the subframe composed of 6 symbols upon receiving important signals.

In the H-FDD frame structure shown in FIG. 19, the idle time may be established at a symbol level for the UL/UL transition gap or symbol level puncturing may be performed, and DU_OFFSET is applied thereto, such that it is possible to support the H-FDD MS without using an additional transition gap after significant signals have been received by the H-FDD MS.

Referring to FIG. 19, in order to establish a transition gap in the DL zone allocated to H-FDD MSs of two groups, if one symbol is allocated to the idle time using the symbol level puncturing, two subframes each including 5 symbols are present in downlink. In addition, DU_OFFSET is applied to the length of one symbol, such that there is no need for additional symbols for allowing the H-FDD MS to receive significant signals to be allocated for the idle time, and the H-FDD MS can transmit data using the subframe composed of 5 symbols in consideration of only the switching duration. In this case, the position of subframe composed of 5 symbols is determined in consideration of the DL/UL switching gap, and the scope of the subframe position is not limited thereto. That is, as can be seen from FIG. 19, the subframe may be located at the foremost and last positions of the allocated DL zone as an example, and the subframe may also be located at other positions as necessary without departing the scope or spirit of the present invention. The subframe having a smaller number of symbols (i.e., the subframe composed of 5 symbols) is used in uplink, such that there is a need for a new UL control channel to be established and used.

Therefore, when using the H-FDD frame structure shown in FIG. 19, DU_OFFSET is applied so that the H-FDD MS reduces the symbol duration for transmission of significant signals and the number of symbols allocated for the transition gap, such that it can use one more subframe as compared to the legacy system. In addition, the H-FDD MS having received the significant signals can utilize an uplink subframe overlapping with the DL subframe for transmission of significant signals in the UL zone without additionally changing the frame structure. In addition, in the H-FDD frame structure, the formation position of the transition gap is changed according to the ratio of the number of DL subframes allocated to each group to the number of UL subframes allocated to each group, such that the DL or UL position of the subframe composed of 5 symbols formed by symbol puncturing is not limited thereto.

Figure 20:
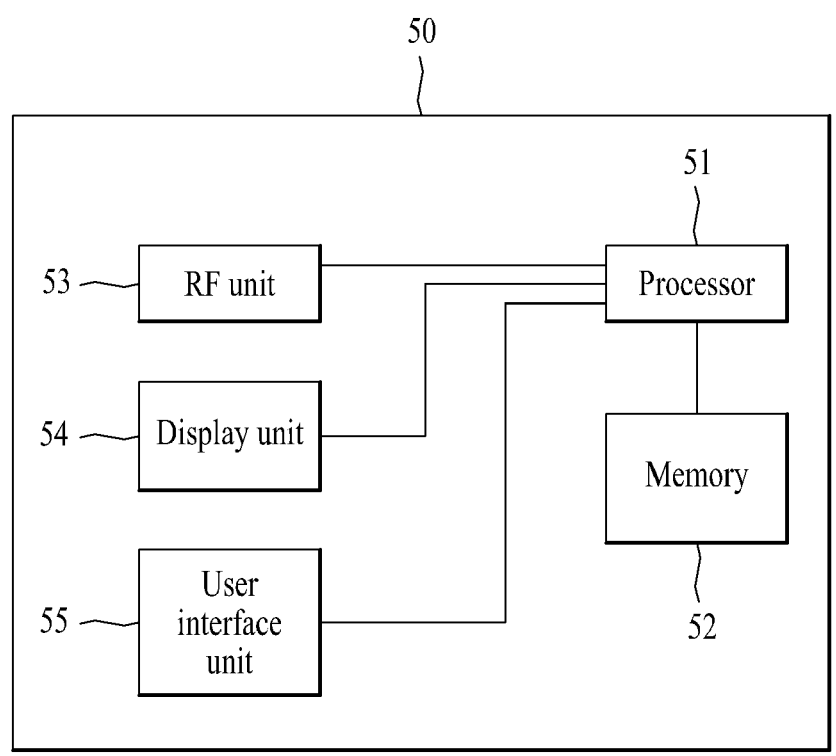
FIG. 20 is a diagram illustrating constituent elements of a device according to an embodiment of the present invention.

FIG. 20 is a diagram illustrating constituent elements of a device 50 according to an embodiment of the present invention.

Referring to FIG. 20, the device 50 includes a processor 51, a memory 52, a Radio Frequency (RF) unit 53, a display unit 54, and a user interface unit 55.

Layers of the radio interface protocol are implemented in the processor 51. The processor 51 provides a control plane and a user plane. The processor 51 may perform functions of each layer. The memory 52, which is electrically connected to the processor 51, stores an operating system, application programs, and general files.

The display unit 54 may display various pieces of information and be configured with a Liquid Crystal Display (LCD), an Organic Light Emitting Diode (OLED), etc. which are known in the art.

The user interface unit 55 may be configured to be combined with a known user interface such as a keypad, a touch screen, or the like.

The RF unit 53, which is electrically connected to the processor 51, transmits and receives RF signals. The RF unit may be classified into a processor transmission (Tx) module (not shown) and a processor reception (Rx) module (not shown). The RF unit 53 can transmit and receive signals through various H-FDD frame structures of the present embodiment. The processor 51 can control the device 50 using signals received through the RF unit 53.

Radio interface protocol layers between the UE and a network can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE and the network may exchange RRC messages with each other through the RRC layer.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

A method and apparatus for performing communication using the H-FDD frame structure in a mobile communication system according to embodiments of the present invention can be applied to various mobile communication systems, for example, 3GPP LTE, LTE-A, IEEE 802 system, and the like.

The invention claimed is:

1. A method for performing communication using a half-frequency division duplex (H-FDD) frame structure in a mobile communication system, the method comprising:
   transceiving signals by each group mobile station (MS) using the H-FDD frame structure in which the order of a downlink zone and an uplink zone is allocated to one group and the reverse order thereof is allocated to another group,
   wherein the downlink zone or uplink zone allocated to each group MS in the H-FDD frame structure includes a subframe in which at least one symbol is allocated to an idle time or punctured, and the each group MS transmits and receives signals using the remaining symbols other than the symbol allocated to the idle time or punctured in the subframe, and
   wherein the subframe in which at least one symbol is allocated to the idle time or punctured is located in the boundary region where the downlink zone or the uplink zone is switched from one group MS to another group MS.

2. The method according to claim 1, wherein each of an uplink zone used by a first group MS from among the each group MS and a downlink zone used by a second group MS from among the each group MS includes two subframes in which one or more symbols are allocated to the idle time or punctured.

3. The method according to claim 1, wherein each of a downlink zone used by a first group MS from among the each group MS and a downlink zone used by a second group MS from among the each group MS includes one subframe in which one or more symbols are allocated to the idle time or punctured.

4. The method according to claim 1, wherein each of an uplink zone used by a first group MS from among the each group MS and an uplink zone used by a second group MS from among the each group MS includes one subframe in which one or more symbols are allocated to the idle time or punctured.

5. The method according to claim 2, wherein the subframe in which one or more symbols are allocated to the idle time or punctured includes first and last uplink subframes used by the first group MS and first and last downlink subframes used by the second group MS.

6. The method according to claim 3, wherein the subframe in which one or more symbols are allocated to the idle time or punctured includes the last downlink subframe used by the first group MS and a first downlink subframe used by the second group MS.

7. The method according to claim 4, wherein the subframe in which one or more symbols are allocated to the idle time or punctured includes a first uplink subframe used by the first group MS and the last uplink subframe used by the second group MS.

8. The method according to claim 1, wherein the subframe in which one or more symbols are allocated to the idle time or punctured includes 5 or 6 symbols.

9. The method according to claim 1, wherein a channel bandwidth of the H-FDD frame structure is set to any one of 5 MHz, 7 MHz, 8.75 MHz, 10 MHz, and 20 MHz.

10. The method according to claim 9, wherein a cyclic prefix (CP) length of the H-FDD frame structure is set to ⅛ or 1/16 of an effective symbol length.

11. A mobile station (MS) for performing communication using a half-frequency division duplex (H-FDD) frame structure in a mobile communication system comprising:
   a radio frequency (RF) unit configured to transmit and receive signals by each group mobile station (MS) using the H-FDD frame structure in which the order of a downlink zone and an uplink zone is allocated to one group and the reverse order thereof is allocated to another group,
   wherein the downlink zone or uplink zone allocated to the each group MS in the H-FDD frame structure includes a subframe in which at least one symbol is allocated to an idle time or punctured, and the each group MS transmits and receives signals using the remaining symbols other than the symbol allocated to the idle time or punctured in the subframe, and
   wherein the subframe in which at least one symbol is allocated to the idle time or punctured is located in the boundary region where the downlink zone or the uplink zone is switched from one group MS to another group MS.

12. The mobile station (MS) according to claim 11, wherein each of an uplink zone used by a first group MS from among the each group MS and a downlink zone used by a second group MS from among the each group MS includes two subframes in which one or more symbols are allocated to the idle time or punctured.

13. The mobile station (MS) according to claim 11, wherein each of a downlink zone used by a first group MS from among the each group MS and a downlink zone used by a second group MS from among the each group MS includes one subframe in which one or more symbols are allocated to the idle time or punctured.

14. The mobile station (MS) according to claim 11, wherein each of an uplink zone used by a first group MS from among the each group MS and an uplink zone used by a second group MS from among the each group MS includes one subframe in which one or more symbols are allocated to the idle time or punctured.

15. The mobile station (MS) according to claim 12, wherein the subframe in which one or more symbols are allocated to the idle time or punctured includes first and last uplink subframes used by the first group MS and first and last downlink subframes used by the second group MS.

16. The mobile station (MS) according to claim 13, wherein the subframe in which one or more symbols are allocated to the idle time or punctured includes the last downlink subframe used by the first group MS and a first downlink subframe used by the second group MS.

17. The mobile station (MS) according to claim 14, wherein the subframe in which one or more symbols are allocated to the idle time or punctured includes a first uplink subframe used by the first group MS and the last uplink subframe used by the second group MS.

18. The mobile station (MS) according to claim 11, wherein the subframe in which one or more symbols are allocated to the idle time or punctured includes 5 or 6 symbols.

19. The mobile station (MS) according to claim 11, wherein a channel bandwidth of the H-FDD frame structure is set to any one of 5 MHz, 7 MHz, 8.75 MHz, 10 MHz, and 20 MHz.

20. The mobile station (MS) according to claim 19, wherein a cyclic prefix (CP) length of the H-FDD frame structure is set to $1/8$ or $1/16$ of an effective symbol length.

* * * * *